United States Patent
Tanazawa et al.

[19]

[11] Patent Number: 6,115,929
[45] Date of Patent: *Sep. 12, 2000

[54] TILT DETECTING DEVICE

[75] Inventors: Masayoshi Tanazawa, Fuchu; Shunji Minami, Fussa, both of Japan

[73] Assignee: Casio Computer Co., Ltd., Tokyo, Japan

[*] Notice: This patent is subject to a terminal disclaimer.

[21] Appl. No.: 09/103,743

[22] Filed: Jun. 24, 1998

[30] Foreign Application Priority Data

Jul. 2, 1997 [JP] Japan ................... 9-190757

[51] Int. Cl.[7] .................................................. G01C 9/10
[52] U.S. Cl. ..................... 33/366.24; 33/365; 200/61.45
[58] Field of Search .................. 33/365, 366.11, 33/366.21, 366.24, 366.25, 366.26, 391.402; 340/440, 429, 689; 200/61.45, 61.53, 61.51, 61.52

[56] References Cited

U.S. PATENT DOCUMENTS

| | | |
|---|---|---|
| 3,520,200 | 7/1970 | Rodgers . |
| 4,001,185 | 1/1977 | Mitsui et al. . |
| 4,493,155 | 1/1985 | Comeau ................... 33/366.26 |
| 4,833,281 | 5/1989 | Maples . |
| 4,972,595 | 11/1990 | Shimamura ................... 33/365 |
| 5,136,126 | 8/1992 | Blair ................... 200/61.52 |
| 5,408,457 | 4/1995 | Fujino et al. ................... 33/366.26 |
| 5,669,147 | 9/1997 | Nakajima ................... 33/366.11 |
| 5,753,872 | 5/1998 | Komiya ................... 200/61.45 |
| 5,765,290 | 6/1998 | Rank et al. ................... 33/365 |
| 5,955,713 | 9/1999 | Titus et al. ................... 33/366.11 |
| 5,965,855 | 10/1999 | Tanazawa et al. ............. 200/61.45 M |

FOREIGN PATENT DOCUMENTS

| | | |
|---|---|---|
| 2671869 | 7/1992 | France ................... 33/365 |
| 2263019 | 7/1993 | United Kingdom . |

Primary Examiner—Diego Gutierrez
Assistant Examiner—Faye Francis
Attorney, Agent, or Firm—Frishauf, Holtz, Goodman, Langer & Chick, P.C.

[57] ABSTRACT

A tilt detecting device for use in various electronic apparatuses such as a watch, electronic notebook or the like. The tilt detecting device includes a projection in a part of a ball containing portion formed in an interior of an insulation case. In the insulation case, two conductive pins are disposed thereon in parallel with each other with a predetermined space, which have a large diameter portion, a small diameter portion and a step between them. In the ball containing portion, a conductive ball is contained therein, which is movable along in a longitudinal direction of the two conductive pins in the ball containing portion when the insulation case is inclined. Only when the insulation case is inclined, the conductive ball is at a position on the large diameter portions to be electrically in contact with the two conductive pins to output a corresponding detection signal.

10 Claims, 22 Drawing Sheets

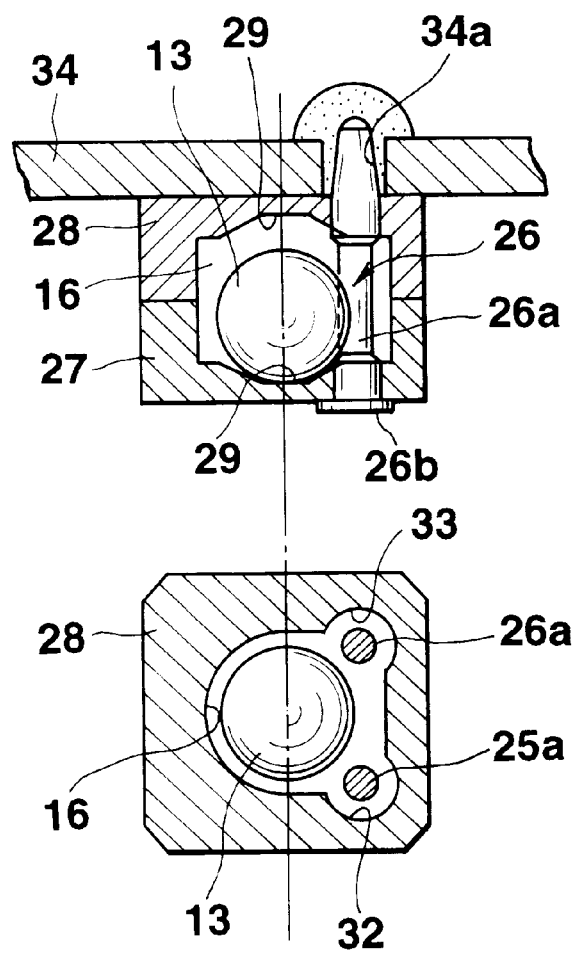

TILT DETECTING DEVICE

BACKGROUND OF THE INVENTION

1. Field of the Invention

The present invention relates to a tilt detecting device.

2. Description of the Related Art

Conventionally, an electronic watch which has a tilt detecting device incorporated in a case, wherein the tilt detecting device detects an inclination of the case, only when a person moves the one's arm to the front of the one and inclines the arm to the one's side, to display a display portion, e.g., a liquid crystal display device or the like for displaying the time and the like by lighting it according to a detection signal, has been known.

In such a tilt detecting device, when the case is held horizontally, a conductive ball incorporated therein is not electrically in contact with a pair of conductive members incorporated in the case so as not to output a corresponding detection signal, while when the case complete is inclined, the conductive ball is electrically in contact with both of the pair of conductive members so that the pair of conductive members are electrically connected to each other through the conductive ball to output the corresponding detection signal.

However, according to the conventional tilt detecting device, there are problems that the tilt detecting device requires a large number of members and a complicated structure. Further, there are problems that a work for assembling the tilt detecting device is also complicated, so that a high production cost is required.

SUMMARY OF THE INVENTION

The present invention has been developed in view of these conventional problems.

An object of the present invention is to provide a tilt detecting device which has a small number of members, a simple structure, an easy work for assembling, and a low price.

In order to solve the above objects, in accordance with one aspect of the invention, a tilt detecting device comprises: an insulation case having a projection in a part of a ball containing portion formed in an interior thereof; two conductive pins which are disposed in parallel with each other with a predetermined space in the insulation case, and have a large diameter portion, a small diameter portion and a step between them; and a conductive ball which is contained in the ball containing portion of the insulation case and is movable along in a longitudinal direction of the two conductive pins in the ball containing portion when the insulation case is inclined; wherein the projection is formed to have a height so that when the insulation case is inclined and the conductive ball is at a position on the large diameter portions of the two conductive pins, the two conductive pins are electrically in contact with the conductive ball, while when the insulation case is inclined and the conductive ball is at a position on the small diameter portion of the two conductive pins, the conductive ball is in contact with the projection, and not electrically in contact with at least one of the two conductive pins.

According to the invention, when the insulation case is inclined to incline the two conductive pins in the longitudinal direction suitably, it is possible to position the conductive ball either on the large diameter portions or the small diameter portion, of the conductive pins, corresponding to the inclination. Therefore, it is possible to put the two conductive pins in an electrically connected state through the conductive ball, and it is also possible to put the one in a cut-off state, so that it is possible to detect the inclination. Further, because the two conductive pins are disposed in parallel in the insulation case, it is possible to form the two conductive pins in the same shape as each other, so that the members of the tilt detecting device can be made in common. Thus, the structure of the device can be simple and the work efficiency for assembling the device can be improved, so that the price of the device can be low.

When the projection in the interior of the insulation case is formed between the two conductive pins and the insulation case is divided into two halves in a lateral direction, i.e., in perpendicular to the two conductive pins which are held horizontal, the divided cases can be formed in the same shape as each other so that the members further can be made in common.

In accordance with another aspect of the invention, a tilt detecting device comprises: an insulation case having a recess portion formed in an inner surface of a ball containing portion formed in an interior of the insulation case; two conductive pins disposed in the insulation case; and a conductive ball which is movable to the recess portion in the ball containing portion or from the recess portion to an outside thereof, when the insulation case is inclined; wherein when the conductive ball is moved to the recess portion, the conductive ball is not electrically in contact with the two conductive pins not to output a corresponding detection signal, while when the conductive ball is moved from the recess portion to the outside thereof, the conductive ball is electrically in contact with the two conductive pins to output a corresponding detection signal.

According to the device, when the conductive ball is moved out of the recess portion in the insulation case with inclining the insulation case, it is possible to put the conductive ball in contact with both of the two conductive pins. Therefore, it is possible to electrically connect the two conductive pins with each other through the conductive ball, so that it is possible to detect the inclination. Further, because it is possible to form the two conductive pins in the same shape as each other, the members of the tilt detecting device can be made in common, the structure of the device can be simple, the work efficiency for assembling the device can be improved, and the price of the device can be low, like the tilt detecting device described preceding.

Preferably, the recess portion is formed in each of the inner surfaces, which faces each other, of the insulation case, and the two conductive pins are positioned at a vicinity of the recess portion and disposed approximately perpendicular to the recess portion. When the insulation case is divided into two halves in a vertical direction, i.e., in perpendicular to the two conductive pins which are held vertical, the divided cases can be formed in the same shape as each other so that the members further can be made in common. Even when the insulation case is turned over upside down, because this tilt detecting device has the same detecting function as the one above-described, it is possible to dispose this device in both up and down sides.

According to a further aspect of the invention, a tilt detecting device comprises: an insulation case which has two terminal portions which are provided with a metal plating on an interior of a ball containing portion and has a recess portion formed in a vicinity of an end of the two terminal portions; and a conductive ball which is movable to the recess portion in the ball containing portion or from the recess portion to an outside thereof, when the insulation case is inclined; wherein when the conductive ball is moved to the recess portion, the conductive ball is not electrically in contact with the two terminal portions not to output a corresponding detection signal, while when the conductive ball is moved from the recess portion to the outside thereof, the conductive ball is electrically in contact with the two terminal portions to output a corresponding detection signal.

According to the device, when the conductive ball is moved out of the recess portion in the insulation case with inclining of the insulation case, it is possible to electrically connect the two terminal portions having a metal plating with each other through the conductive ball, so that it is possible to detect the inclination, like the above-described device. Further, because the two terminal portions are formed with the insulation case as a body in the interior of the insulation case, the number of members of the tilt detecting device can be decreased so that the work for assembling the device can be simplified remarkably.

BRIEF DESCRIPTION OF THE DRAWINGS

FIGS. 6A to 6C show the states of the tilt detecting device in use, shown in FIG. 1, wherein FIG. 6A is a cross-sectional view of a circuit board held in a horizontal state, to which the tilt detecting device is attached; FIG. 6B is a cross-sectional view of the circuit board which is inclined to the right side so that the position of a small diameter portion side is lower than that of a large diameter portion side; and FIG. 6C is a cross-sectional view of the circuit board which is inclined to the left side so that the position of the small diameter portion side is higher than that of the large diameter portion side;

FIGS. 10A and 10B show states of the tilt detecting device in use, shown in FIG. 8 when the device is attached to the upper surface of a circuit board; wherein FIG. 10A is a vertical sectional view of the tilt detecting device wherein the circuit board is held approximately horizontal; and FIG. 10B is a transverse sectional view thereof;

FIGS. 13A and 13B show states of the tilt detecting device in use, shown in FIG. 8 when the device is attached to the lower surface of the circuit board; wherein FIG. 13A is a vertical sectional view of the tilt detecting device wherein the circuit board is held approximately horizontal; and FIG. 13B is a transverse sectional view thereof;

FIGS. 29A and 29B show a production process of a body case shown in FIG. 28; wherein FIG. 29A is a perspective view of a formed body case; and FIG. 29B is a perspective view of the body case partially provided with metal plating.

PREFERRED EMBODIMENT OF THE INVENTION

First Embodiment:

The first embodiment of the tilt detecting device in accordance with the present invention will be explained with reference to FIGS. 1 to 6.

Figure 1:
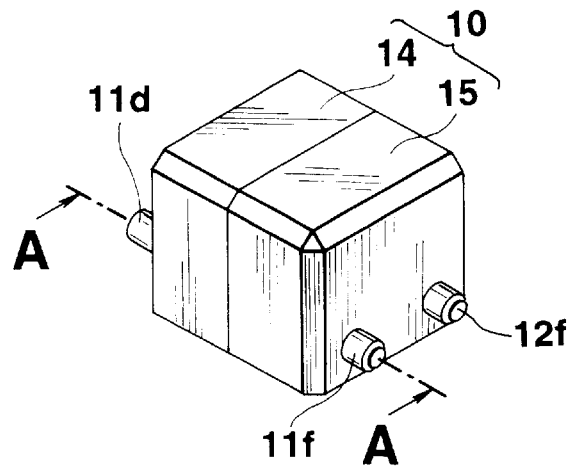
FIG. 1 is a perspective view showing a first embodiment of the tilt detecting device of the invention.
Figure 2:
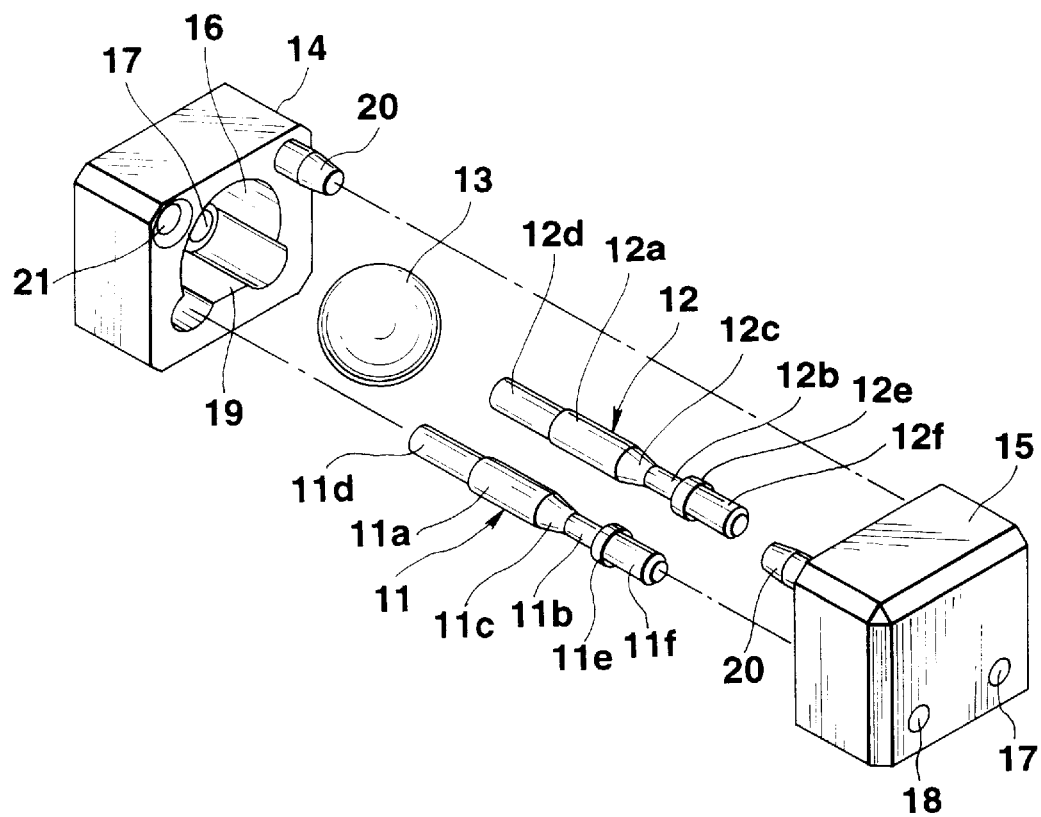
FIG. 2 is an exploded perspective view of the tilt detecting device shown in FIG. 1.

FIG. 1 is a perspective view of the tilt detecting device, and FIG. 2 is an exploded perspective view thereof.

The tilt detecting device comprises an insulation case 10, two conductive pins 11 and 12 disposed in the insulation case 10, and a conductive ball 13 which is movable in the insulation case 10 along in a longitudinal direction of the two conductive pins 11 and 12 when the insulation case 10 is inclined.

Each of the two conductive pins 11 and 12 is made of a conductive material such as a metal or the like and has a large diameter portion 11a and 12a and a small diameter portion 11b and 12b, respectively. In each of the two conductive pins 11 and 12, a tapered portion 11c and 12c is formed between the large diameter portion 11a and 12a and the small diameter portion 11b and 12b, a large diameter side attachment portion 11d and 12d is formed in the other side of the large diameter portion 11a and 12a, and a small diameter side attachment portion 11f and 12f is formed in the other side of the small diameter portion 11b and 12b through an intermediate portion 11e and 12e, respectively. In this case, each diameter of the large diameter side attachment portion 11d and 12d and the small diameter side attachment portion 11f and 12f is formed in the same as one another, and each diameter of the large diameter portion 11a and 12a and the intermediate portion 11e and 12e is approximately the same as one another.

The insulation case 10 comprises a first case 14 and a second case 15 which are the right and left portion of the insulation case 10 when the insulation case 10 is divided. The first and second cases 14 and 15 are made of an insulating material such as synthetic resin or the like and the both cases are formed in absolutely the same shape as each other.

A containing portion 16 is formed in an interior of the first case 14 which is the left side of the insulation case 10. A right surface side of the containing portion 16, which faces to the second case 15, is opened. In a lower portion of a back wall, i.e., a left side wall in FIG. 3, of the first case 14, attachment holes 17 and 18 are formed in a horizontal direction side by side, for inserting each large diameter side attachment portion 11d and 12d or each small diameter side attachment portion 11f and 12f, of the two conductive pins 11 and 12 thereinto. In an interior of the containing portion 16, a projection 19 described later is formed between the two conductive pins 11 and 12. In one corner of an upper portion of a right surface of the first case 14, a boss 20 is formed in projecting, while in the other corner thereof, a fitting recess 21 is formed.

Figure 3:
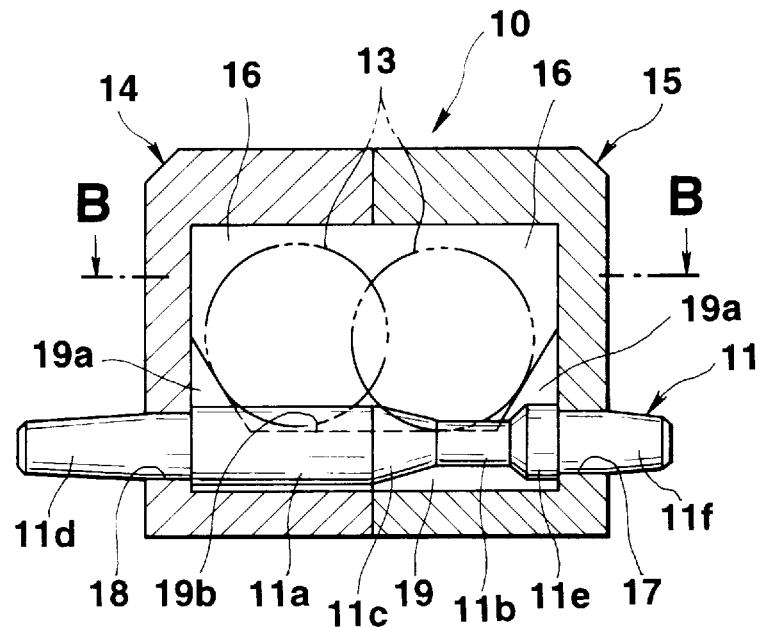
FIG. 3 is an enlarged cross-sectional view taken along the line A—A of FIG. 1.
Figure 4:
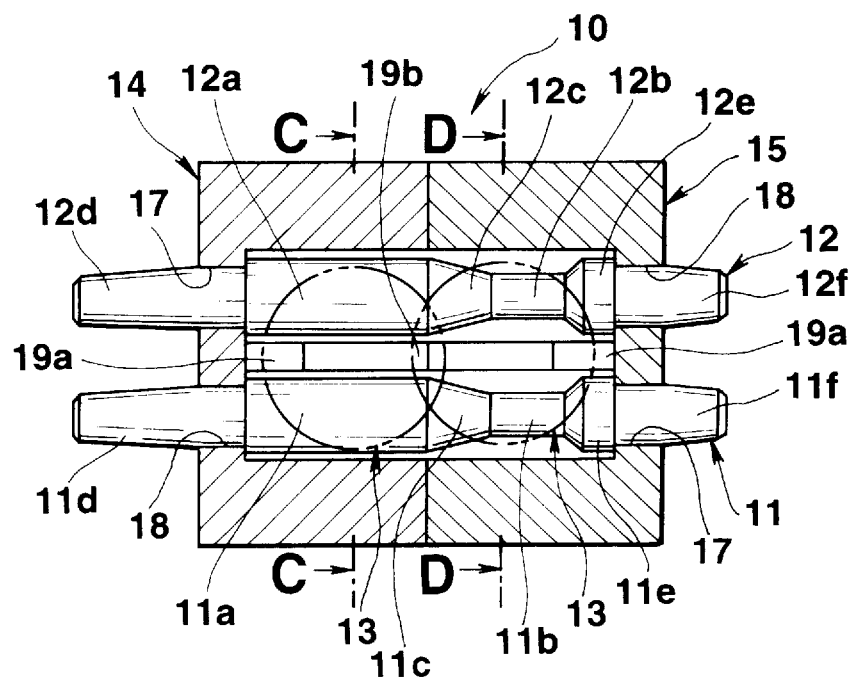
FIG. 4 is a cross-sectional view taken along the line B—B of FIG. 3.

Because the first case 14 and the second case 15 are formed in the same shape as each other, as shown in FIGS. 2 and 3, when the opening side surfaces of the containing portions 16, of the first and second cases 14 and 15 face to each other in the lateral direction and the attachment holes 17 and 18 face each other laterally, the bosses 20 of them face to the fitting recesses 21. For example, when each large diameter side attachment portion 11d and 12d of the two conductive pins 11 and 12 is inserted from a side of the containing portion 16 of the first case 14 into each attachment hole 17 and 18 of the first case 14, the two conductive pins 11 and 12 are attached to the first case 14 approximately horizontal. Then, when the conductive ball 13 is contained in the interior of the containing portion 16 of the first case 14 and each small diameter side attachment portion 11f and 12f of the two conductive pins 11 and 12 is inserted from a side of the containing portion 16 of the second case 15 into each attachment hole 17 and 18 of the second case 15, the two conductive pins 11 and 12 are attached to the first and second cases 14 and 15 and each boss 20 is fitted in each fitting recess 21. Therefore, the first and second cases 14 and 15 are combined with each other with containing the two conductive pins 11 and 12 and the conductive ball 13 in each containing portion 16. As the result, the insulation case 10 shown in FIG. 1 is produced and each end portion of the large diameter side attachment portions 11d and 12d and the small diameter side attachment portions 11f and 12f, of the two conductive pins 11 and 12 projects to an outside of the insulation case 10.

In both ends of the projection 19 formed between the two conductive pins 11 and 12 in the interior of the each containing portion 16 of the first and second cases 14 and 15, a slope portion 19a is formed respectively, which projects to an upper side of the conductive pins 11 and 12, as shown in FIG. 3, and an intermediate projecting portion 19b is formed between the slope portions 19a approximately horizontal.

When the insulation case 10 is inclined and the conductive ball 13 is at a position on an end side of the projection 19 in the interior of the containing portions 16, the conductive ball 13 is in contact with the slope portion 19a.

The intermediate projecting portion 19b is formed approximately horizontal over from the position of the large diameter portions 11a and 12a to that of the small diameter portions 11b and 12b, of the two conductive pins 11 and 12. The top surface of the intermediate projecting portion 19b is slightly lower than upper ends of the small diameter portions 11b and 12b.

Figure 5A:
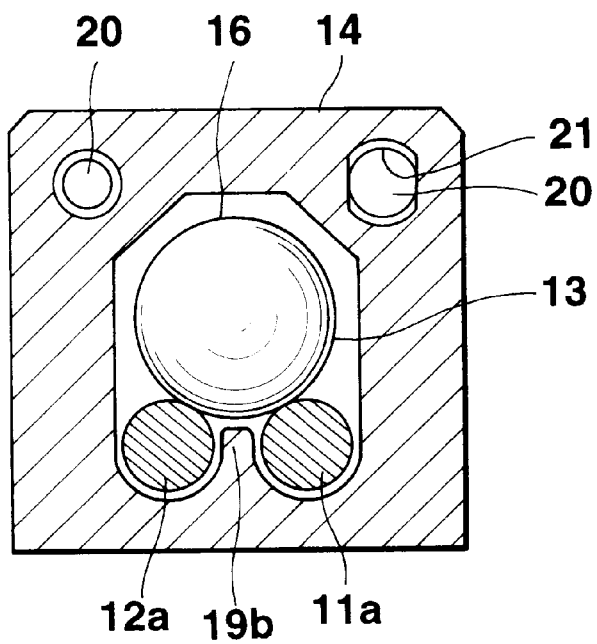
FIG. 5A is a cross-sectional view taken along the line C—C of FIG. 4.
Figure 5B:
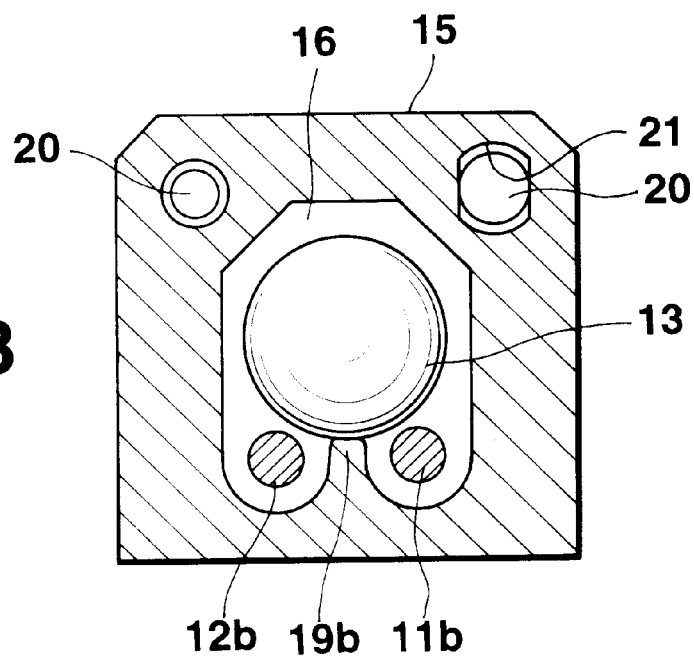
FIG. 5B is a cross-sectional view taken along the line D—D of FIG. 4.

As the result, when the conductive ball 13 is at a position on the both large diameter portions 11a and 12a of the two conductive pins 11 and 12, the conductive ball 13 is in contact with both of the two conductive pins 11 and 12, with being apart from the intermediate projecting portion 19b in upward, as shown in FIG. 5A, while when the conductive ball 13 is at a position above the both small diameter portions 11b and 12b of the two conductive pins 11 and 12, the conductive ball 13 is in contact with an upper end of the intermediate projecting portion 19b, and not in contact with at least one of the two conductive pins 11 and 12, as shown in FIG. 5B.

Then, an example using the tilt detecting device will be explained in reference to FIGS. 6A to 6C.

Figure 6A:
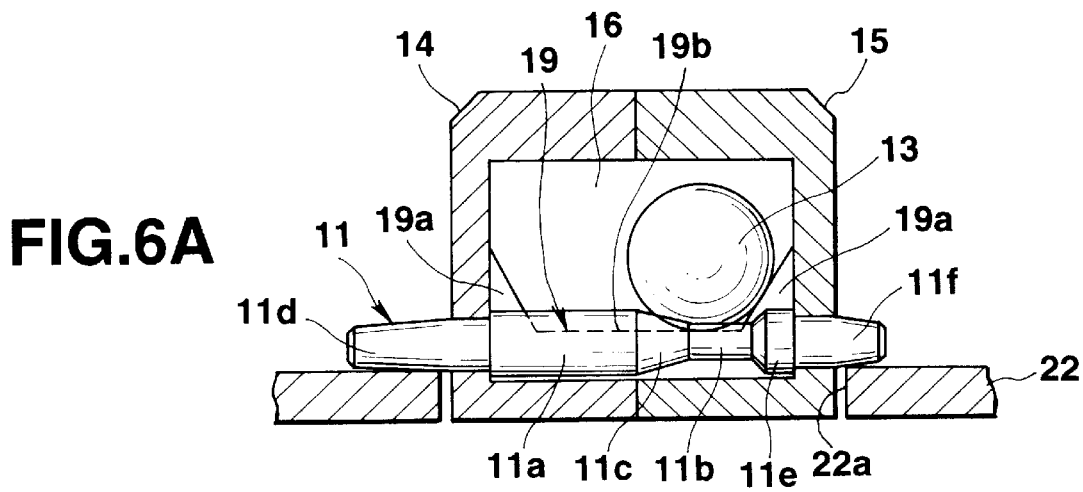

The tilt detecting device is attached to a circuit board 22 in an electronic watch in electrically connected state, for example, by inserting a lower portion of the insulation case 10 into an opening portion 22a formed on the circuit board 22 from an upper side, and by soldering each attachment portion 11d, 12d, 11f, and 12f of the two conductive pins 11 and 12, which projects to the outside of the insulation case 10, to a connecting electrode which is not shown, formed on an upper surface of the circuit board 22, as shown in FIG. 6A.

Figure 6B:
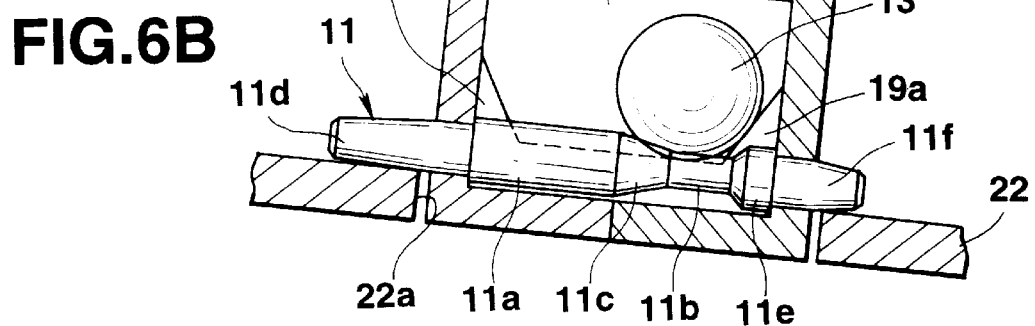

In the tilt detecting device, the insulation case 10 is usually inclined so that the side of the small diameter portions 11b and 12b of the two conductive pins 11 and 12 is lower than that of the large diameter portions 11a and 12a, as shown in FIG. 6B. Then, because the conductive ball 13 is in contact with the upper end of the intermediate projecting portion 19b of the projection 19, and not in contact with at least one of the two conductive pins 11 and 12, as shown in FIG. 5B, the two conductive pins 11 and 12 are not electrically connected with each other to be in "off" state.

Figure 6C:
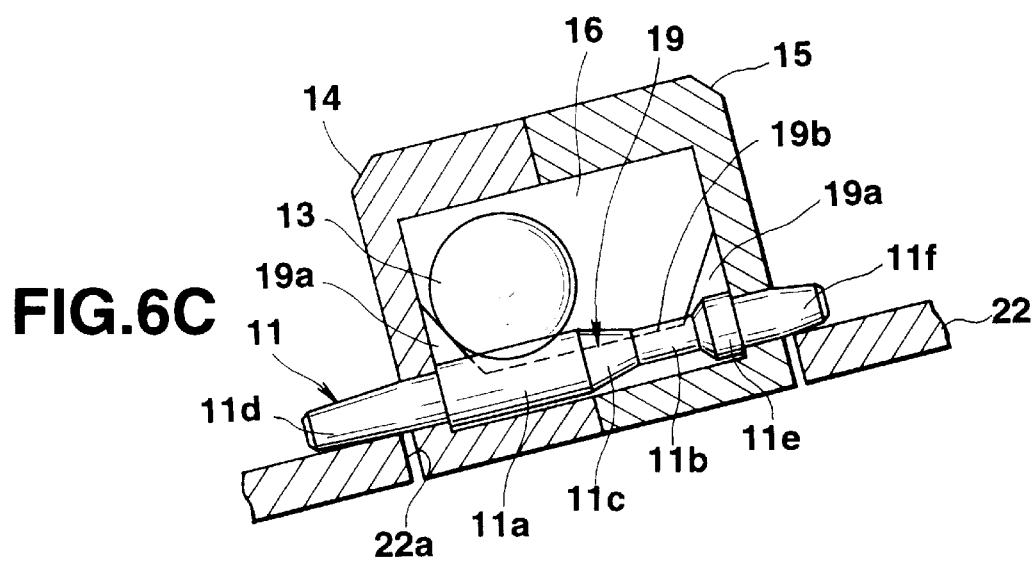

When the insulation case 10 is inclined so that the side of the large diameter portions 11a and 12a of the two conductive pins 11 and 12 is lower than that of the small diameter portions 11b and 12b, as shown in FIG. 6C, the conductive ball 13 is rolled on the two conductive pins 11 and 12 to be moved to the large diameter portions 11a and 12a from the small diameter portions 11b and 12b by crossing the tapered portions 11c and 12c. As the result, the conductive ball 13 is in contact with both of the two conductive pins 11 and 12, and apart from the intermediate projecting portion 19b, as shown in FIG. 5A. Therefore, the two conductive pins 11 and 12 are electrically connected with each other through the conductive ball 13 to change the state to "on" to output a detection signal.

When the insulation case 10 is held in an approximately horizontal state, as shown in FIG. 6A, and the conductive ball 13 is moved to the tapered portions 11c and 12c of the two conductive pins 11 and 12, the conductive ball 13 is in contact with both of the tapered portions 11c and 12c, and apart from the intermediate projecting portion 19b. Therefore, the two conductive pins 11 and 12 are electrically connected with each other through the conductive ball 13 to change the state to "on" to output the detection signal.

As described above, according to the tilt detecting device, by inclining the insulation case 10 to incline the two conductive pins 11 and 12 in the longitudinal direction suitably, it is possible to position the conductive ball 13 either on the large diameter portions 11a and 12a or on the small diameter portion 11b and 12b, of the two conductive pins 11 and 12. Therefore, it is possible to put the two conductive pins 11 and 12 in an electrically connected state through the conductive ball 13, and it is also possible to put the one in a cut-off state, so that it is possible to detect the inclination.

Particularly, because the two conductive pins 11 and 12 are disposed in parallel in the insulation case 10, it is possible to form the two conductive pins 11 and 12 in absolutely the same shape as each other, so that the members of the tilt detecting device can be made in common. Thus, the structure of device one can be simple and the work efficiency for assembling the device can be improved, so that the price of the device can be low. In this case, because the projection 19 in the interior of the insulation case 10 is formed between the two conductive pins 11 and 12, when the two conductive pins 11 and 12 are horizontal and the insulation case 10 is divided into the first and second cases 14 and 15 in the laterally direction, the two cases can be formed in absolutely the same shape as each other, so that the members of the tilt detecting device can be also made in common, the structure of the device can be much simpler, the work efficiency for assembling the device can be much improved, and the price of the device can be much lower.

Figure 7:
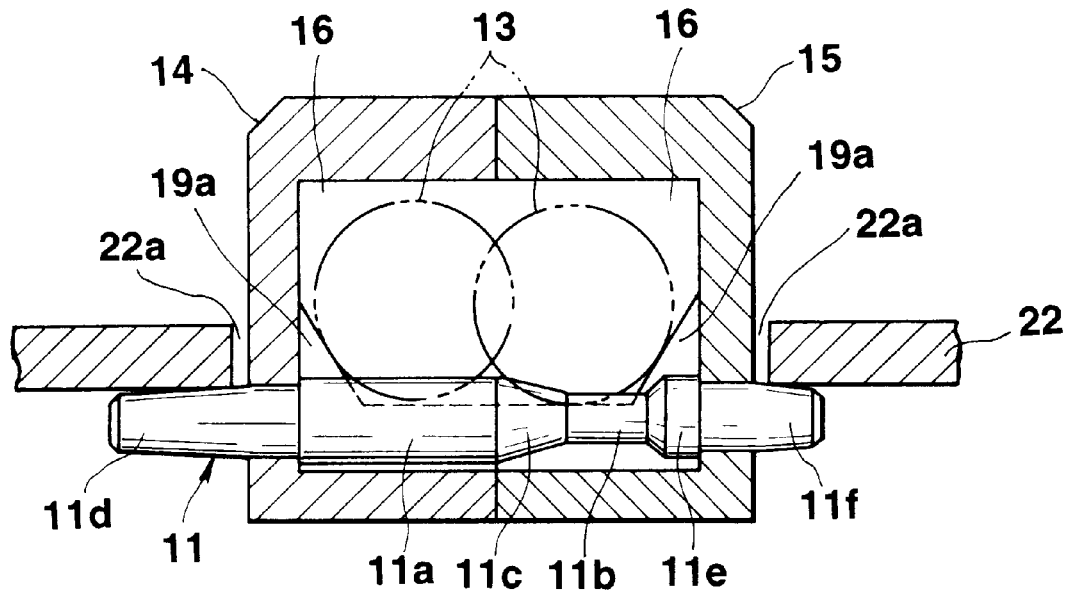
FIG. 7 is a cross-sectional view of a modified example of the first embodiment wherein the tilt detecting device is attached to the circuit board.

According to the first embodiment, by inserting the insulation case 10 into the opening portion 22a of the circuit board 22 from the upper side, each of the attachment portions 11d, 12d, 11f, and 12f of the two conductive pins 11 and 12, which projects to the outside of the insulation case 10 is soldered to the connecting electrode formed on the upper surface of the circuit board 22. However, the invention is not limited to this. The tilt detecting device can be attached to the circuit board 22 in electrically connected state, for example, by inserting the insulation case 10 into the opening portion 22a of the circuit board 22 from a lower side, and by soldering each of the attachment portions 11d, 12d, 11f, and 12f of the two conductive pins 11 and 12, which projects to the outside of the insulation case 10, to the connecting electrode which is not shown, formed on a lower surface of the circuit board 22, as shown in FIG. 7.

In the first embodiment described above, when the insulation case 10 is held approximately horizontal and the conductive ball 13 is moved to the tapered portions 11c and 12c of the two conductive pins 11 and 12, the conductive ball 13 is in contact with both of the tapered portions 11c and 12c, so that the two conductive pins 11 and 12 are electrically connected with each other through the conductive ball 13 to change the state to "on". However, the invention is not limited to this. For example, by coating an insulating film to the surfaces of the both tapered portions 11c and 12c of the two conductive pins 11 and 12, even if the conductive ball 13 is in contact with both of the tapered portions 11c and 12c of the two conductive pins 11 and 12, the two conductive pins 11 and 12 are not electrically connected with each other through the conductive ball 13. As the result, when the two conductive pins 11 and 12 are slightly inclined and the conductive ball 13 is moved to the tapered portions 11c and 12c, the two conductive pins 11 and 12 are not electrically connected with each other, while only when the two conductive pins 11 and 12 are further inclined and the conductive ball 13 is moved to the large diameter portions 11a and 12a, with crossing the tapered portions 11c and 12c, the two conductive pins 11 and 12 can be electrically connected with each other through the conductive ball 13 to output the detection signal.

Second Embodiment:

Next, a second embodiment of the tilt detecting device in the invention will be explained with reference to FIGS. 8 to 15. To structural members or the like corresponding to those of the first embodiment shown in FIGS. 1 to 6, the same reference numerals are attached, and the detailed explanation for them is omitted.

Figure 8:
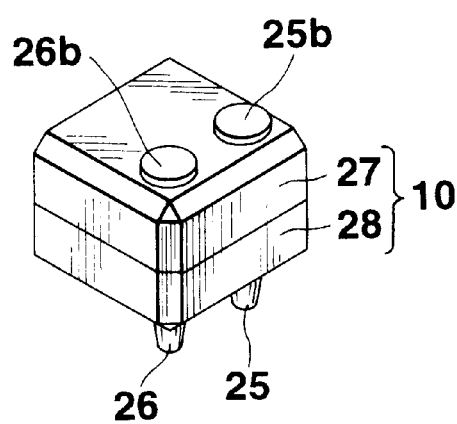
FIG. 8 is a perspective view of a second embodiment of the tilt detecting device of the invention.
Figure 9:
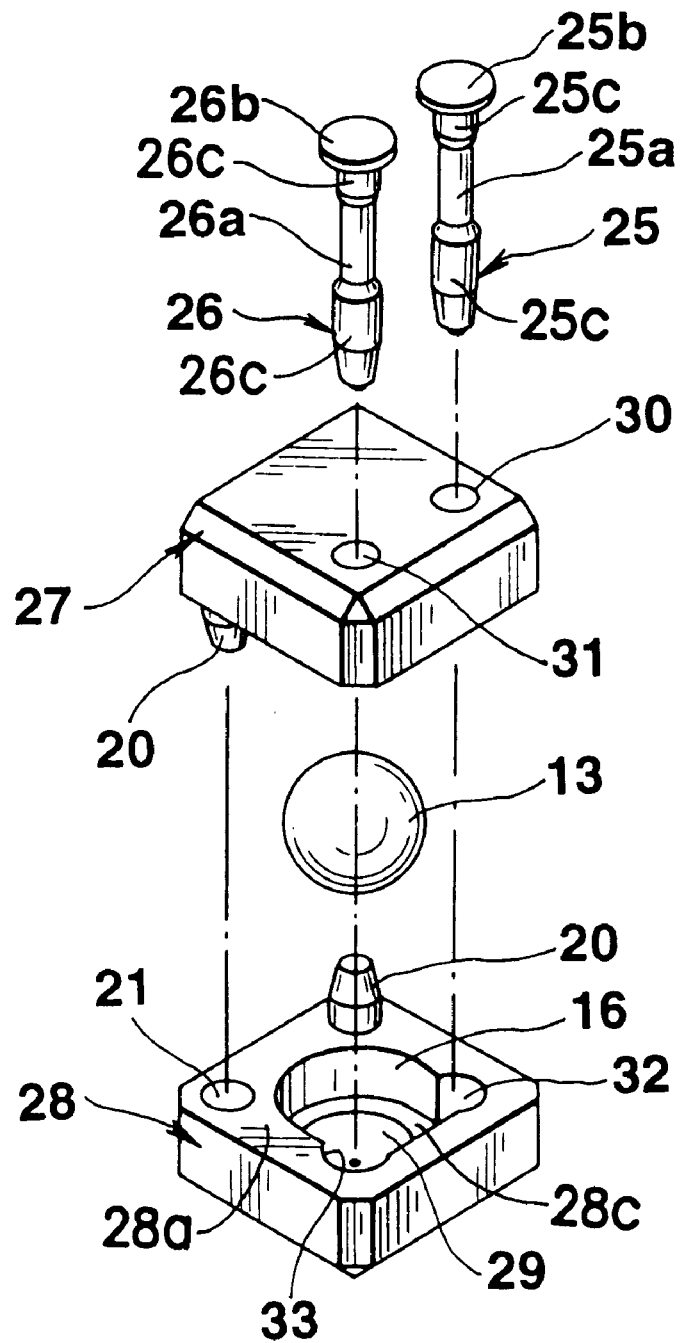
FIG. 9 is an exploded perspective view of the tilt detecting device shown in FIG. 8.

The tilt detecting device comprises the insulation case 10, two conductive pins 25 and 26 disposed in the insulation case 10, and the conductive ball 13 which is movable in the insulation case 10 to be in contact with or separated from the two conductive pins 25 and 26 when the insulation case 10 is inclined, as shown in FIGS. 8 and 9.

Each of the two conductive pins 25 and 26 is made of the conductive material such as a metal or the like and which has large diameter portions 25c and 26c, a small diameter portion 25a and 26a in each intermediate portion, a head portion 25b and 26b in each upper end portion, and a tapered lower end portion.

The insulation case 10 comprises a first case 27 and a second case 28 which are the top and bottom portions of the insulation case 10 when the insulation case 10 is divided in the vertical direction. The first and second cases 27 and 28 are made of the insulating material such as a synthetic resin or the like and formed in absolutely the same shape as each other, like the first embodiment.

Figure 10A:
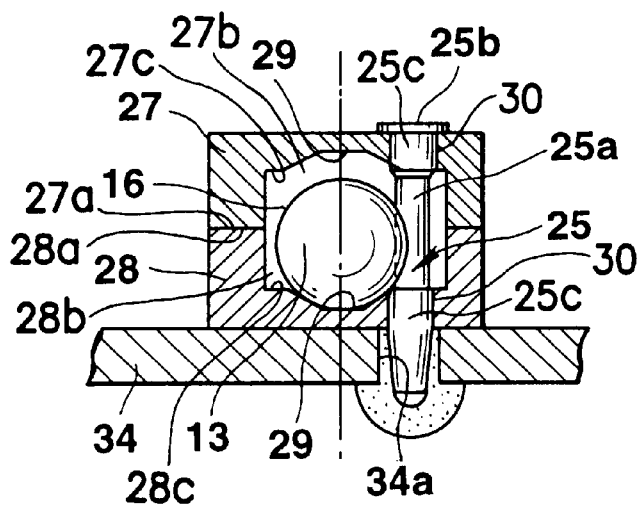

As shown in FIG. 10A, the cases 27 and 28 have concavities 27b and 28b at surfaces 27a and 28a faced to each other, and the concavities 27b and 28b have bottom surfaces 27c and 28c, respectively.

The containing portion 16 is formed in an interior of the second case 28 which is the lower side of the insulation case 10. An upper surface side of the containing portion 16, which faces to the first case 27 is opened, as shown in FIG. 9. In a bottom portion of the second case 28, a recess portion 29 in which the conductive ball 13 is contained is formed, as shown in FIG. 10A. In a right side of the bottom portion of the second case 28, with adjusting the recess portion 29, attachment holes 30 and 31, the two conductive pins 25 and 26 are inserted thereto, are formed in side by side. In the interior surface of the containing portion 16 of the second case 28, approximately half circular shaped recesses 32 and 33 are formed corresponding to the attachment holes 30 and 31.

In one corner of a left side of the upper surface of the second case 28, the boss 20 is formed projecting upward, while in the other corner thereof, the fitting recess 21 is formed, like the first embodiment.

Figure 10B:
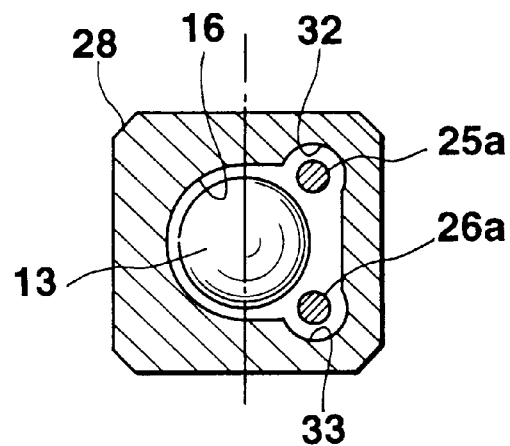

Because the first case 27 and the second case 28 are formed in the same shape as each other, as shown in FIGS. 9, 10A and 10B, when the opening surfaces of the containing portions 16, of the first and second cases 27 and 28 face in the vertical direction to each other and the attachment holes 30 and 31 face in the vertical direction to each other, the bosses 20 of them face to the fitting recesses 21. By containing the conductive ball 13 in the interior of the containing portion 16 of the second case 28, and by fitting the bosses 20 to the fitting recesses 21, the first and second cases 27 and 28 are combined with each other, so that the insulation case 10 is produced.

After that, the two conductive pins 25 and 26 are inserted from the upper side of the first case 27 into the attachment holes 30 and 31 of the second case 28 through the each of the attachment holes 30 and 31 of the first case 27. Then, each of the lower end portions of the two conductive pins 25 and 26 projects to the outside of the lower side of the second case 28. As the result, the two conductive pins 25 and 26 are incorporated to the insulation case 10. In this case, each of the small diameter portions 25a and 26a of the two conductive pins 25 and 26 is disposed in the approximately half circular shaped recesses 32 and 33 in the first and second cases 27 and 28 to be exposed to each of the containing portions 16. Therefore, the conductive ball 13 can be in contact with the two conductive pins 25 and 26.

Then, an example using the tilt detecting device will be explained in reference to FIGS. 10 to 15.

The tilt detecting device is attached to a circuit board 34 of an electronic watch, in an electrically connected state, for example, by inserting each of the lower end portions of the two conductive pins 25 and 26 projecting to the lower side of the insulation case 10 into an attachment hole 34a formed on the circuit board 34 from the upper side, and by soldering each of the lower end portions of the two conductive pins 25 and 26, which is projected to the lower side of the circuit board 34, to a connecting electrode which is not shown, formed on the lower surface of the circuit board 34, as shown in FIG. 10A.

In the tilt detecting device, when the circuit board 34 is held approximately horizontal, the two conductive pins 25 and 26 in the insulation case 10 are held approximately vertical, as shown in FIG. 10A. In this case, because the conductive ball 13 is at a position in the recess portion 29 of the second case 28 of the lower side of the insulation case 10, the conductive ball 13 is apart from both of the small diameter portions 25a and 26a of the two conductive pins 25 and 26, as shown in FIG. 10B. Therefore, the two conductive pins 25 and 26 are not electrically connected with each other through the conductive ball 13 to be in "off" state.

Figure 11A:
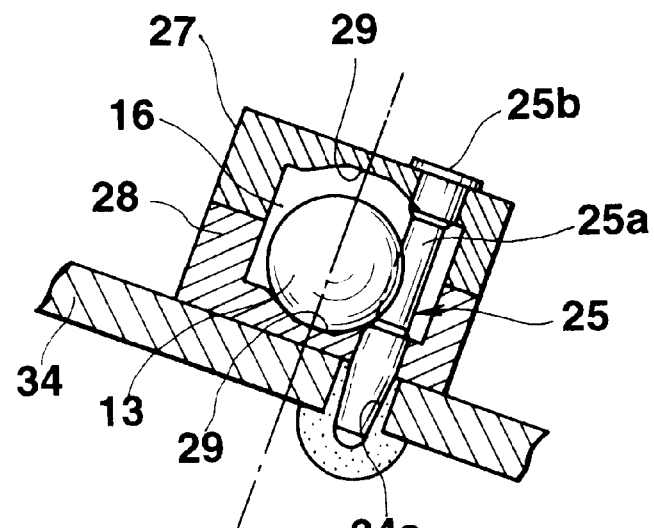
FIG. 11A is a vertical sectional view of the circuit board shown in FIG. 10, which is inclined so that the right side is slightly lower than the left side.
Figure 11B:
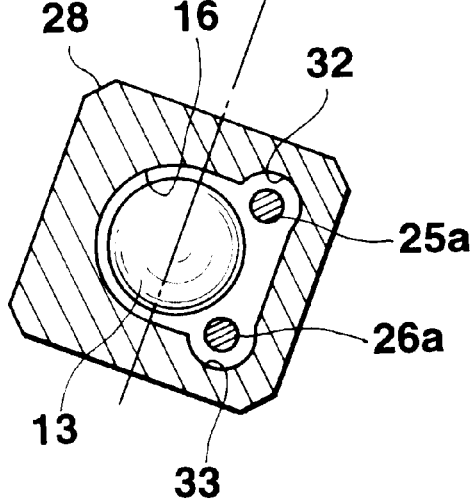
FIG. 11B is a transverse sectional view thereof.

When the insulation case 10 is slightly inclined to right down with the circuit board 34, the conductive ball 13 is not apart from the recess portion 29 of the second case 28, as shown in FIG. 11A. As the result, when the conductive ball 13 is closed to each of the small diameter portions 25a and 26a of the two conductive pins 25 and 26, the conductive ball 13 is not in contact with the two conductive pins 25 and 26, as shown in FIG. 11B. Therefore, the two conductive pins 25 and 26 are not electrically connected with each other through the conductive ball 13 to maintain the "off" state.

Figure 12A:
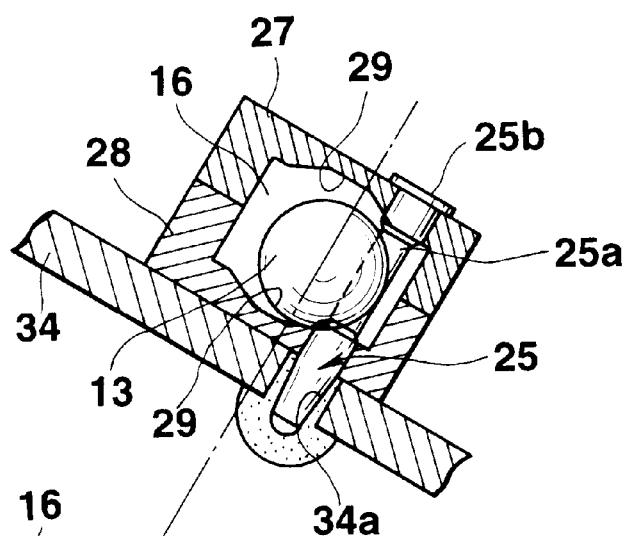
FIG. 12A is a vertical sectional view of the circuit board shown in FIG. 10, which is inclined to the right side further.
Figure 12B:
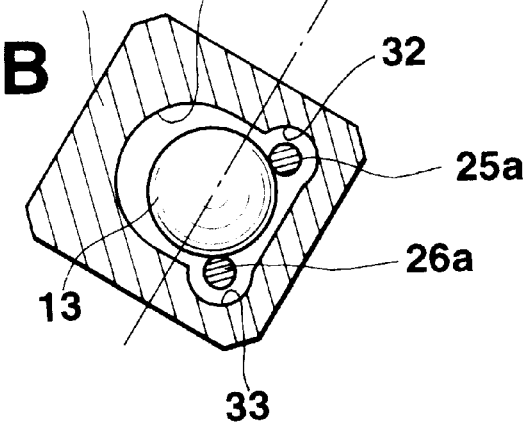
FIG. 12B is a transverse sectional view thereof.

When the insulation case 10 is further inclined to right down with the circuit board 34, the conductive ball 13 is apart from the recess portion 29 of the second case 28, as shown in FIG. 12A. As the result, the conductive ball 13 is in contact with both of the small diameter portions 25a and 26a of the two conductive pins 25 and 26, as shown in FIG. 12B. Therefore, the two conductive pins 25 and 26 are in electrically connected with each other through the conductive ball 13 to change the state to "on" to output the detection signal.

The tilt detecting device can be attached to the circuit board 34, in an electrically connected state, by turning over the insulation case 10 upside down, by inserting each of the upper end portions of the two conductive pins 25 and 26 projecting to the upper side of the insulation case 10 into the attachment hole 34a formed on the circuit board 34 from the lower side to project to the upper surface side of the circuit board 34, and by soldering each of the projected upper end portions of the two conductive pins 25 and 26 to the connecting electrode which is not shown, formed on the upper surface of the circuit board 34, as shown in FIG. 13A.

In the tilt detecting device, when the circuit board 34 is held approximately horizontal, the two conductive pins 25 and 26 in the insulation case 10 are held approximately vertical, as shown in FIG. 13A. In this case, because the conductive ball 13 is at a position in the recess portion 29 of the first case 27 of the lower side of the insulation case 10, the conductive ball 13 is apart from both of the small diameter portions 25a and 26a of the two conductive pins 25 and 26, as shown in FIG. 13B. Therefore, the two conductive pins 25 and 26 are not electrically connected with each other through the conductive ball 13 to be in "off" state.

Figures 14A, 14B:
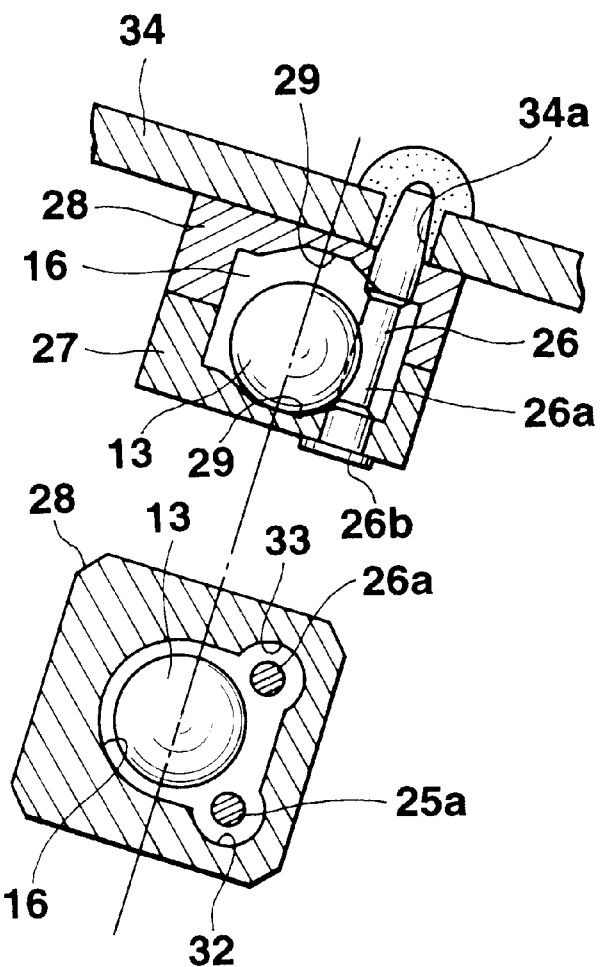
FIG. 14A is a vertical sectional view of the tilt detecting device shown in FIG. 13, wherein the circuit board is inclined so that the right side is slightly lower than the left side.
FIG. 14B is a transverse sectional view thereof.

When the insulation case 10 is slightly inclined to right down with the circuit board 34, the conductive ball 13 is not apart from the recess portion 29 of the first case 27, as shown in FIG. 14A. As the result, when the conductive ball 13 is closed to each of the small diameter portions 25a and 26a of the two conductive pins 25 and 26, the conductive ball 13 is not in contact with the two conductive pins 25 and 26, as shown in FIG. 14B. Therefore, the two conductive pins 25 and 26 are not electrically connected with each other through the conductive ball 13 to maintain the "off" state.

Figure 15A:
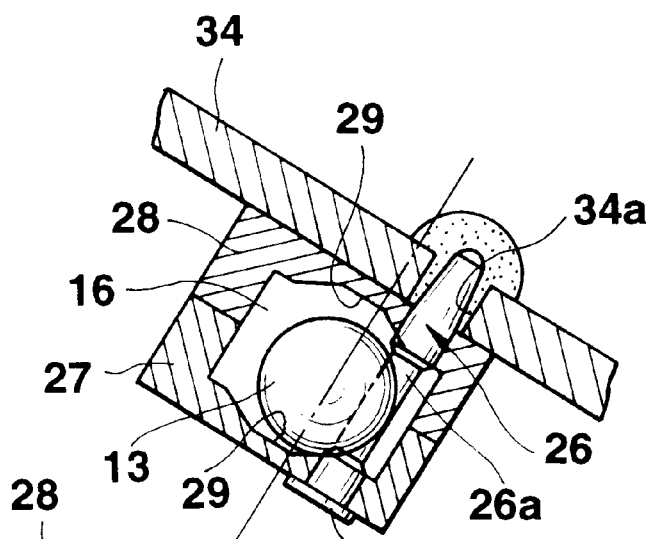
FIG. 15A is a vertical sectional view of the tilt detecting device shown in FIG. 13, wherein the circuit board is inclined to the right side further.
Figure 15B:
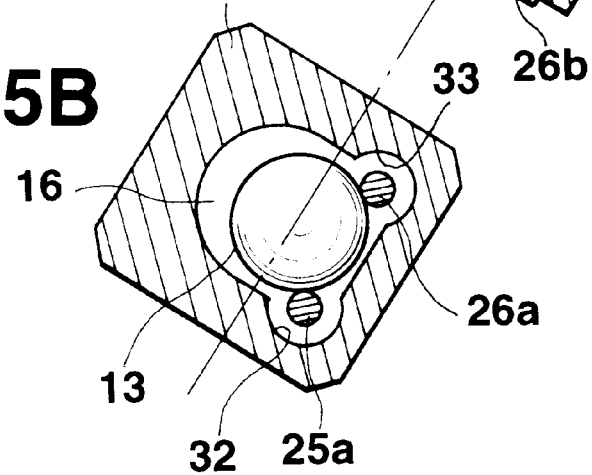
FIG. 15B is a transverse sectional view thereof.

When the insulation case 10 is further inclined to right down with the circuit board 34, the conductive ball 13 is apart from the recess portion 29 of the first case 27, as shown in FIG. 15A. As the result, the conductive ball 13 is in contact with both of the small diameter portions 25a and 26a of the two conductive pins 25 and 26, as shown in FIG. 15B. Therefore, the two conductive pins 25 and 26 are electrically connected with each other through the conductive ball 13 to change the state to "on" to output the detection signal.

According to the tilt detecting device, by moving the conductive ball 13 out of the recess portion 29 in the insulation case 10 with inclining the insulation case 10, it is possible to put the conductive ball 13 in contact with both of the small diameter portions 25a and 26a of the two conductive pins 25 and 26. Therefore, it is possible to electrically connect the two conductive pins 25 and 26 with each other through the conductive ball 13 to detect the inclination.

In the tilt detecting device, because the two conductive pins 25 and 26 are disposed in approximately vertical in the vicinity of the recess portion 29 in the insulation case 10, it is possible to form the two conductive pins 25 and 26 in absolutely the same shape as each other. As the result, the members of the tilt detecting device can be made in common and the structure of the one can be simple. Further, after combining the first and second cases 27 and 28 with each other with containing the conductive ball 13 in either of the containing portions 16 of the first and second cases 27 and 28, the two conductive pins 25 and 26 can be attached to the insulation case 10. Therefore, the work efficiency for assembling the tilt detecting device can be improved than the first embodiment, so that the price of the device can be much lower.

Particularly, in the tilt detecting device, the recess portion 29 of the insulation case 10 is formed in each of the inner surfaces of the each containing portion 16 of the first and second cases 27 and 28, wherein the inner surfaces face to each other. When the two conductive pins 25 and 26 are held vertical and the insulation case 10 is divided into the first and second cases 27 and 28 of top and bottom portions thereof, the first and second cases 27 and 28 can be formed in absolutely the same shape as each other, so that the members of the tilt detecting device can be also made in common. Therefore, the structure of the device can be simple and the work efficiency for assembling the device can be improved, so that the price of the device can be mush lower. Even when the insulation case 10 is turned over upside down, because this tilt detecting device has the same detecting function as that of the above-described case, it is possible to dispose this device in both upper and lower sides of the circuit board 34.

Third Embodiment:

Next, a third embodiment of the tilt detecting device in the invention will be explained with reference to FIGS. 16 to 19. To structural members or the like corresponding to those of the second embodiment shown in FIGS. 8 to 15, the same reference numerals are attached, and the detailed explanation for them is omitted.

The tilt detecting device comprises the insulation case 10, two conductive pins 25 and 26 disposed in the insulation case 10, the conductive ball 13 which is movable in the insulation case 10, like the second embodiment, and a pair of terminal plates 36, i.e., connective fixing members, for fixing the insulation case 10 to a circuit board 35, with being in electrically connected the two conductive pins 25 and 26 with the circuit board 35.

Each of the pair of terminal plates 36 is made of a metal plate, and the center portion thereof are cut off in rectangular shape. The upper and lower end portions 36a and 36b of each terminal plate 36 are bent approximately perpendicular to the side surface of the insulation case 10 and in different directions to each other. Two pin attachment holes 37 are formed in the lower end bent portion 36a. The two pin attachment holes 37 are for injecting each of the lower end portions of the two conductive pins 25 and 26.

To attach the tilt detecting device to the circuit board 35 in the electronic watch, for example, after the insulation case 10 is assembled by combining the first and second cases 27 and 28 with each other, the two conductive pins 25 and 26 are incorporated to the insulation case 10 to project each of the lower end portions of the two conductive pins 25 and 26 to the outside of the lower surface of the insulation case 10, like the second embodiment.

Figure 16:
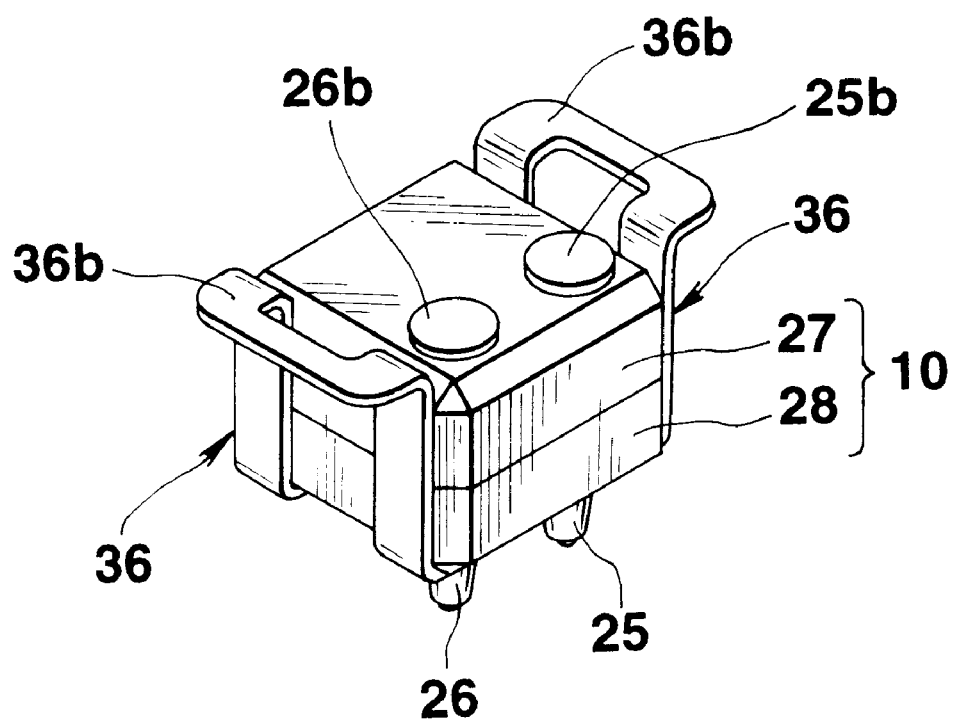
FIG. 16 is a perspective view of a third embodiment of the tilt detecting device of the invention.
Figure 17:
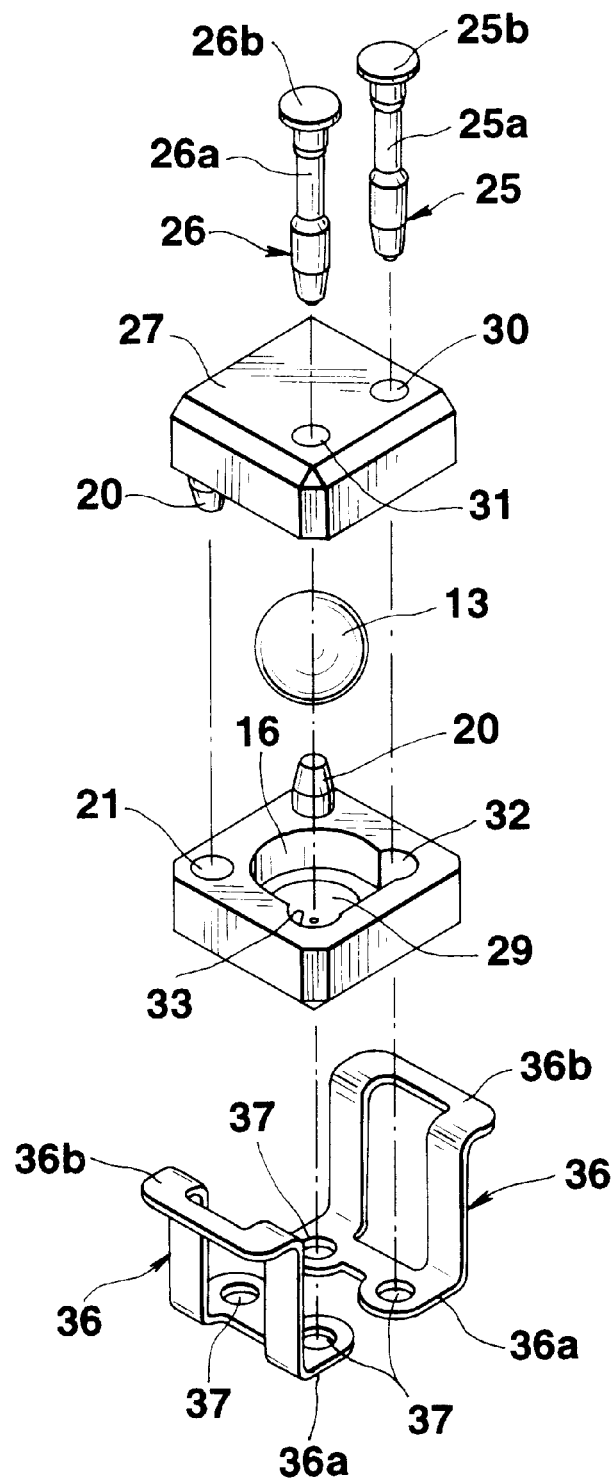
FIG. 17 is an exploded perspective view of the tilt detecting device shown in FIG. 16.

Then, each lower end portion 36a of the pair of the terminal plates 36 is disposed on the lower side of the insulation case 10, and each center portion of the pair of the terminal plates 36 is faced to the side surfaces of the insulation case 10, so that each of the upper end portions 36b of the pair of the terminal plates 36 faces in the upper side direction of the insulation case 10, as shown in FIG. 17. Thereafter, each of the lower end portions of the two conductive pins 25 and 26 is injected to each of the two pin attachment holes 37 formed in the each lower end portion 36a of the pair of the terminal plates 36. As the result, the pair of the terminal plates 36 are attached to the insulation case 10, as shown in FIG. 16.

Figure 18:
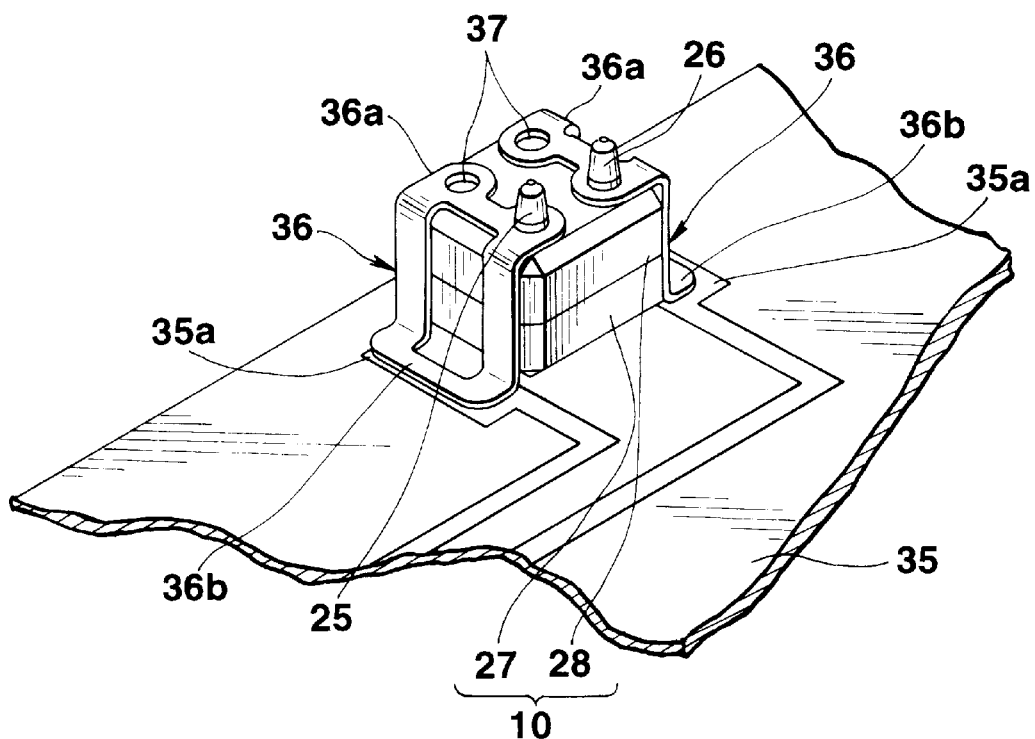
FIG. 18 is a perspective view of the tilt detecting device which is turned over upside down shown in FIG. 16.
Figure 19:
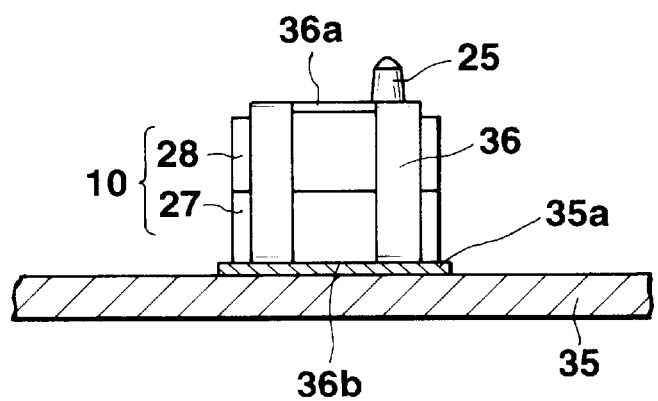
FIG. 19 is a side view of the tilt detecting device shown in FIG. 18 which is attached to a circuit board.

As shown in FIG. 18, by turning over the insulation case 10 to which the pair of the terminal plates 36 are attached upside down, to bring the upper end portions 36b of the pair of the terminal plates 36 shown in FIG. 16 into contact with the upper surface of the circuit board 35, and by soldering the each upper end portion 36b to a connecting electrode 35a formed on an upper surface of the circuit board 35, the two conductive pins 25 and 26 are electrically connected with each other through the terminal plates 36 and the insulation case 10 is fixed to the circuit board 35 by the pair of terminal plates 36.

As described above, in the tilt detecting device, by injecting each of the lower end portions of the two conductive pins 25 and 26 to each of the two pin attachment holes 37 formed in the each lower end portion 36a of the pair of the terminal plates 36 to attach the pair of terminal plates 36 to the insulation case 10, by turning over the insulation case 10 upside down, and by soldering the each upper end portion 36b of the pair of the terminal plates 36 to the connecting electrode 35a of the circuit board 35, it is possible to electrically connect the two conductive pins 25 and 26 with each other through the terminal plates 36 and to fix the insulation case 10 to the circuit board 35 by the pair of terminal plates 36. Therefore, there is no need for forming a hole or the like for attaching the members on the circuit board 35 and it is possible to attach the insulation case 10 to the circuit board 35 easily and certainly.

Fourth Embodiment:

A fourth embodiment of the tilt detecting device of the invention will be explained with reference to FIGS. 20 to 26. To structural members or the like corresponding to those of the second embodiment shown in FIGS. 8 to 15, the same reference numerals are attached, and the detailed explanation for them is omitted.

Figure 20:
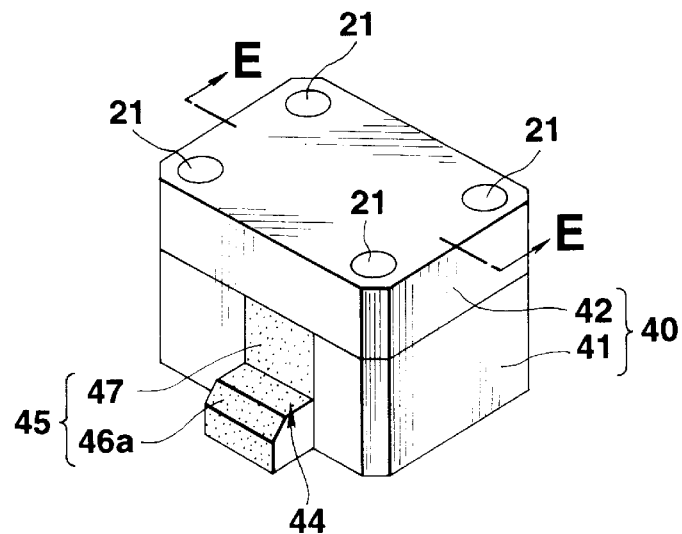
FIG. 20 is a perspective view of a fourth embodiment of the tilt detecting device of the invention.
Figure 21:
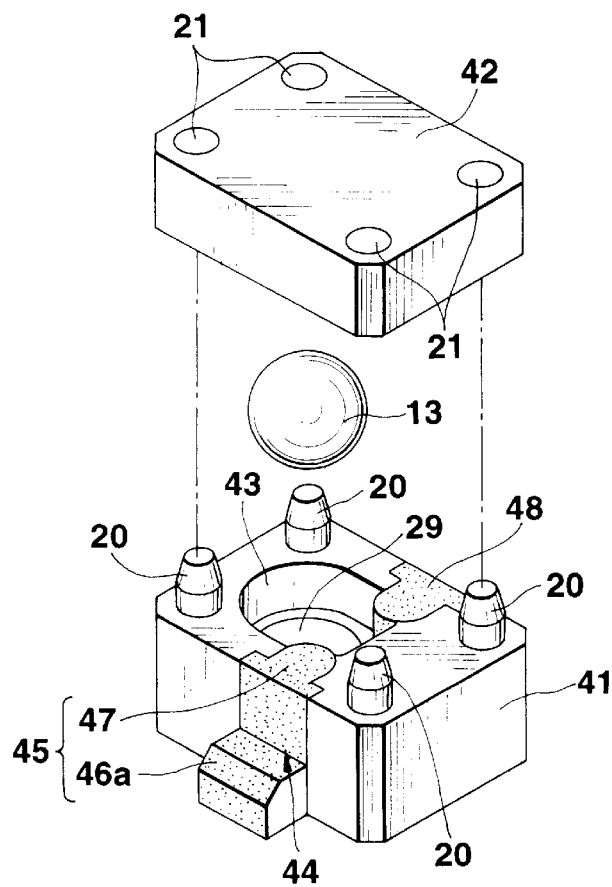
FIG. 21 is an exploded perspective view of the tilt detecting device shown in FIG. 20.
Figure 22:
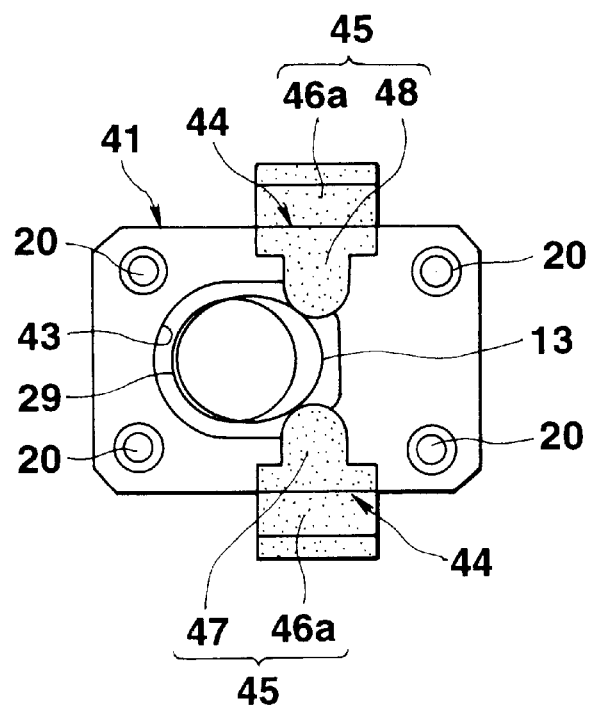
FIG. 22 is a plan view of a body case shown in FIG. 21.

The tilt detecting device comprises an insulation case 40 and the conductive ball 13 which is movable in the insulation case 40 when the insulation case 40 is inclined, as shown in FIGS. 20 and 21.

Figure 23:
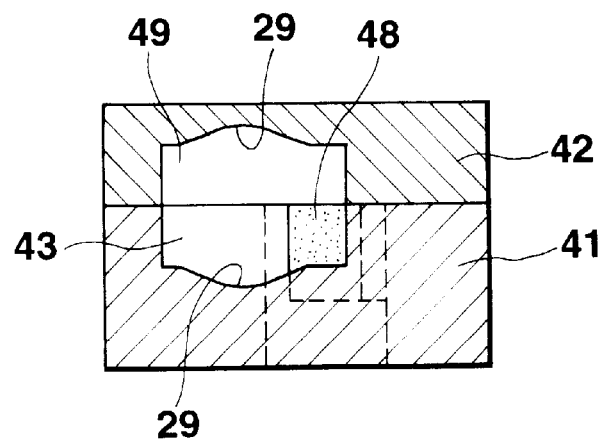
FIG. 23 is a cross-sectional view taken along the line E—E of the insulation case shown in FIG. 20.

The insulation case 40 comprises a body case 41 and a lid case 42, which are made of the insulating material such as the synthetic resin or the like. A containing portion 43 is formed in an interior of the body case 41 and an upper surface side of the containing portion 43, which faces to the lid case 42, is opened, as shown in FIG. 21. In a bottom portion of the body case 41, the recess portion 29 for containing the conductive ball 13 is formed, as shown in FIG. 23. The body case 41 which is adjacent to the recess portion 29 and a terminal member 45 having a partial metal plating 44 are formed as a body.

Figure 24A:
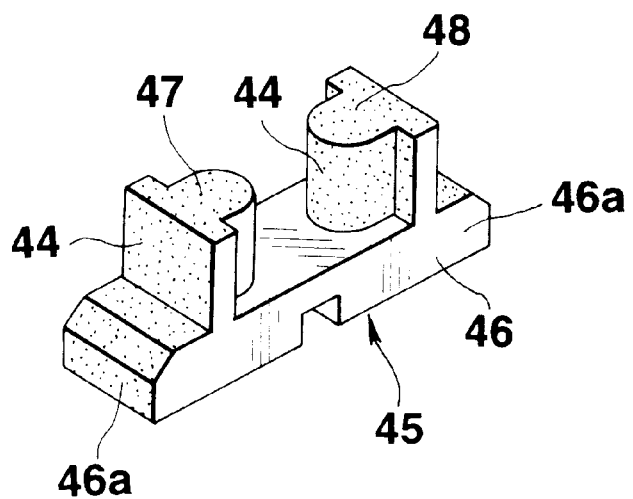
FIG. 24A is a perspective view of a terminal member of the body case.
Figure 24B:
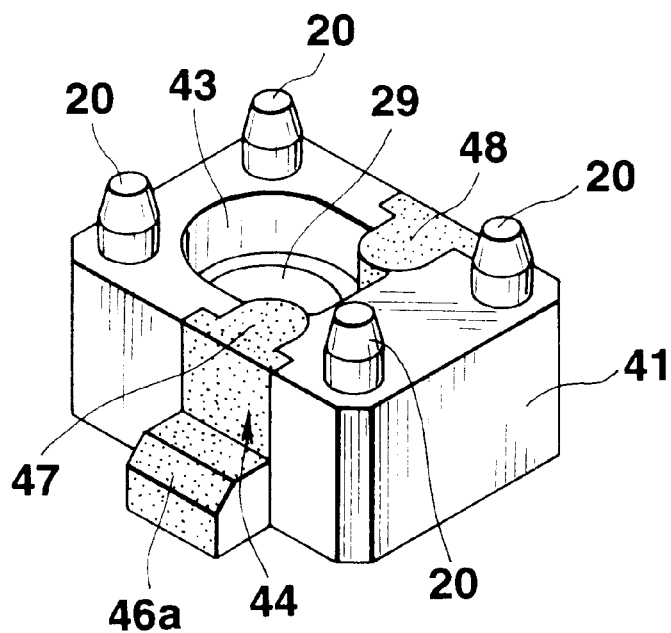
FIG. 24B is a perspective view of a body case with which the terminal member is formed as a body.
Figure 25:
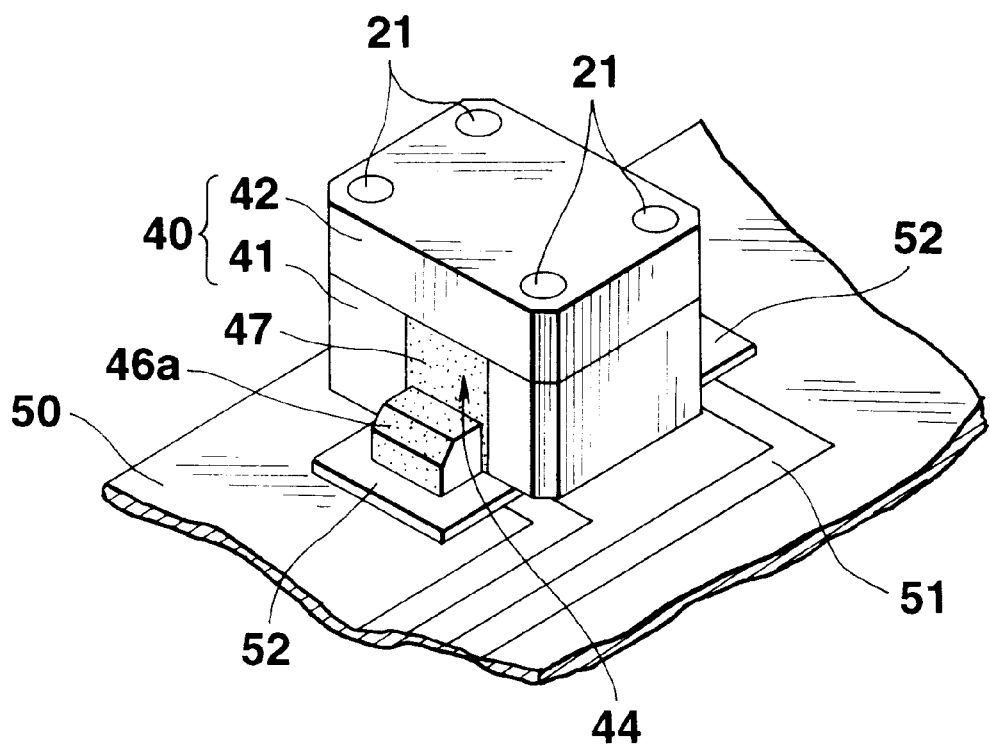
FIG. 25 is a perspective view of the tilt detecting device shown in FIG. 20, which is attached to a circuit board.

The terminal member 45 comprises two terminal portions 47 and 48 on a base portion 46, which are formed with the terminal member 45 as a body, facing each other, as shown in FIG. 24A. The base portion 46 is at a position on a lower portion of the body case 41 and projecting portions 46a projecting to an outside of the body case 41 are formed on both ends of the base portion 46, as shown in FIG. 24B. The two terminal portions 47 and 48 have plate portions which are the same plan as an outer surfaces of the body case 41. Half circular portions are formed in facing to each other on the opposite surfaces of the plate portions, and each a part of the both half circular portions is projected into the containing portion 43 to expose. In the terminal member 45, the partial metal plating 44 is carried out by electroless plating on the surfaces of the both two terminal portions 47 and 48 and surfaces including an lower surface of the both projecting portions 46a in the both ends of the base portion 46. That is, the partial metal plating 44 is carried out on the terminal member 45 so that the two terminal portions 47 and 48 are not electrically connected with each other.

In four corners of the upper surface of the body case 41, each boss 20 is formed to project into the upper side. While in four corners of the lid case 42, fitting recesses 21 for fitting the bosses 20 of the body case 41 are formed. In the lower surface of the lid case 42, a containing portion 49 corresponding to the containing portion 43 of the body case 41 is formed and a lower side of the containing portion 49 is opened. In an upper surface of the interior of the containing portion 49, the recess portion 29 is formed, on which the conductive ball 13 is at a position when the insulation case 40 is turned over upside down.

To produce the tilt detecting device, as shown in FIG. 24A, after the terminal member 45 is primary molded, the partial metal plating 44 is carried out by electroless plating on the surfaces of the both two terminal portions 47 and 48 of the terminal member 45 and on the surfaces including the lower surfaces of the both projecting portions 46a in the both ends of the base portion 46. Thereafter, the terminal member 45 provided with the partial metal plating 44 is disposed in a die for secondary molding to secondary mold the body case 41, as shown in FIG. 24B. As the result, terminal portion 45 and the body case 41 are formed as a body. Thus, the two terminal portions 47 and 48 of the terminal member 45 are at a position in a vicinity of the recess portion 29 of the containing potion 43 and each the part of the both half circular portions of the two terminal portions 47 and 48 is exposed to the containing portion 43. Thereafter, the conductive ball 13 is contained in the containing potion 43 of the body case 41 and the fitting recesses 21 of the lid case 42 are fitted to the bosses 20 of the upper surface of the body case 41. Then, the lid case 42 is combined with the body case 41 to produce the insulation case 40. Therefore, the containing portions 43 and 49 are faced to each other in the interior of the insulation case 40, so that the conductive ball 13 is contained to be movable in both of the containing portions 43 and 49.

Figure 26:
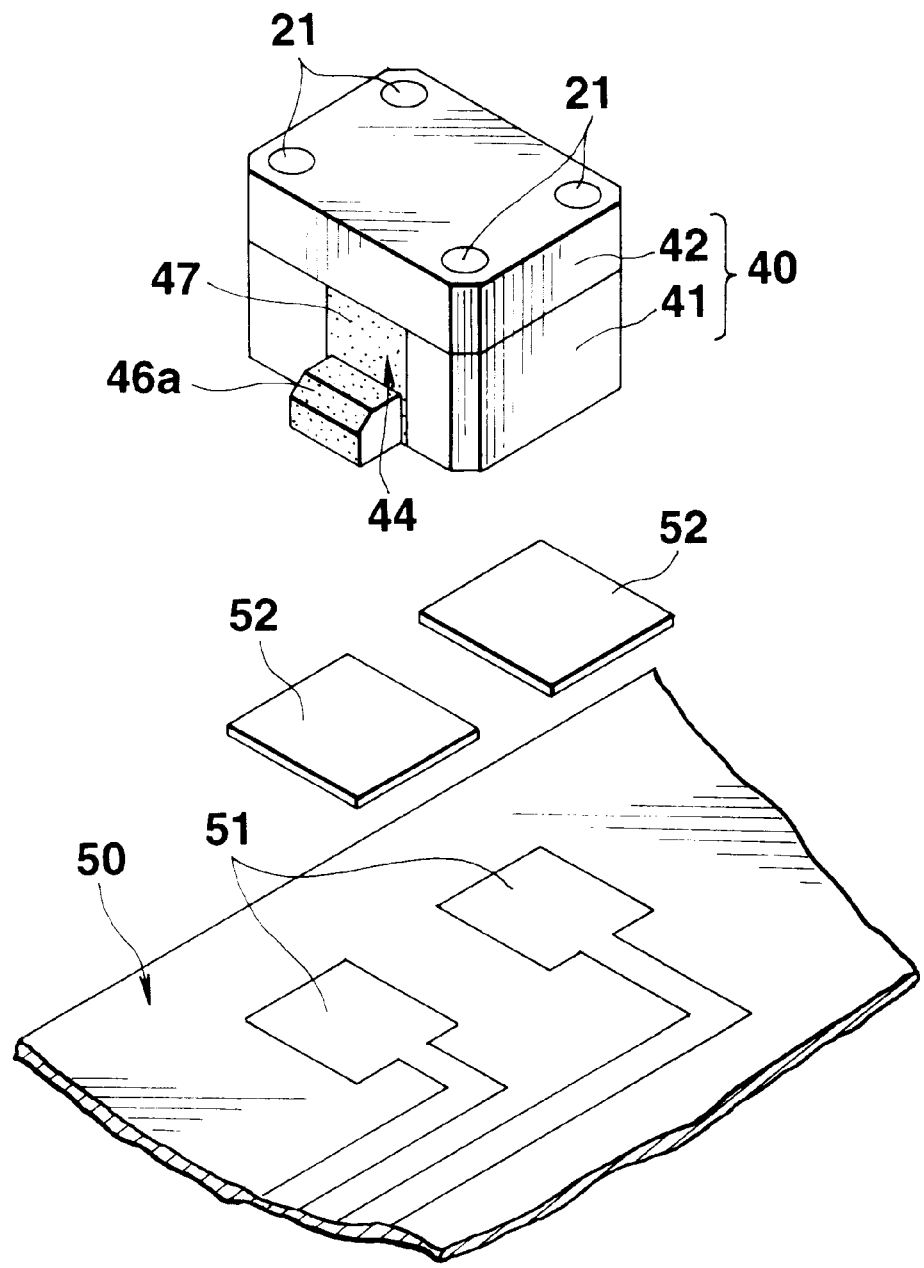
FIG. 26 is an exploded perspective view of the tilt detecting device shown in FIG. 25.

To attach the tilt detecting device to a circuit board 50 in the electronic watch, for example, each of the projecting portions 46a of the terminal member 45 of the insulation case 40 is faced to each upper side of the two connecting electrodes 51 formed on an upper surface of the circuit board 50, as shown in FIG. 26. Two conductive double-coated tapes 52 are inserted between the two connecting electrodes 51 and the projecting portions 46a to connect and fix the each projecting portion 46a to the each connecting electrode 51. Therefore, each connecting electrode 51 and each partial metal plating 44 of the terminal member 45 are electrically connected with each other through the double-coated tapes 52, so that the two terminal portions 47 and 48 of the terminal member 45 are electrically connected with the each connecting electrode 51.

As described above, according to the tilt detecting device, like the second embodiment, by inclining the insulation case 40 to move the conductive ball 13 out of the recess portion 29 of the insulation case 40, it is possible to put the conductive ball 13 in contact with both of the two terminal portions 47 and 48 having the partial metal plating 44. As the result, it is possible to electrically connect the two terminal portions 47 and 48 with each other through the conductive ball 13, so that the inclination can be detected.

In the tilt detecting device, because the terminal member 45 which has the partial metal plating 44 on the two terminal portions 47 and 48 and on each of the projecting portions 46a of the base portion 46 are formed with the body case 41 of the insulation case 40 as a body by coinjection molding, it is not necessary for another member such a conductive pin or the like used in the first to third embodiments. Therefore, the numbers of members can be decreased and the work for assembling can be much simpler.

Further, according to the tilt detecting device, by connecting the each projecting portion 46a of the body case 41 with the circuit board 50 through the conductive double-coated tapes 52 to fix the insulation case 40 to the circuit board 50, it is possible to electrically connect the two terminal portions 47 and 48 of the body case 41 with the each connecting electrode 51 of the circuit board 50. Therefore, it is possible to connect the tilt detecting device with the circuit board 50 extreme easily. However, it is not necessary to attach the tilt detecting device to the upper surface of the circuit board 50, for example, which may be connected with and fixed to the lower surface of the circuit board 50 through the conductive double-coated tape 52.

When the tilt detecting device is turned over upside down to connect with the circuit board 50, although the conductive ball 13 is contained in the recess portion 29 in the containing potion 49 of the lid case 42, the tilt detecting device has the same function as the above-described case.

Fifth Embodiment:

A fifth embodiment of the tilt detecting device in the invention will be explained with reference to FIGS. 27 to 29. To structural members or the like corresponding to those of the fourth embodiment shown in FIGS. 20 to 26, the same reference numerals are attached, and the detailed explanation for them is omitted.

Figure 27:
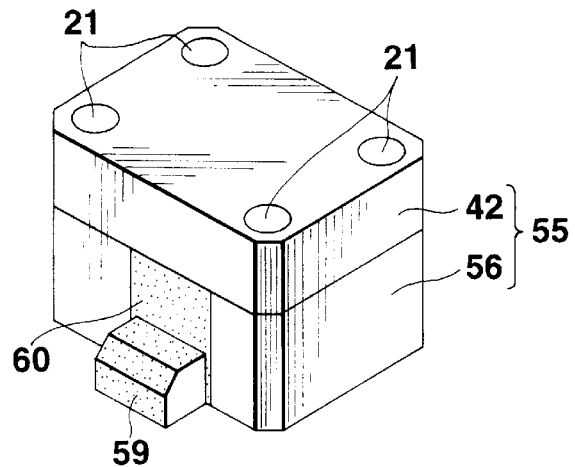
FIG. 27 is a perspective view of a fifth embodiment of the tilt detecting device of the invention.
Figure 28:
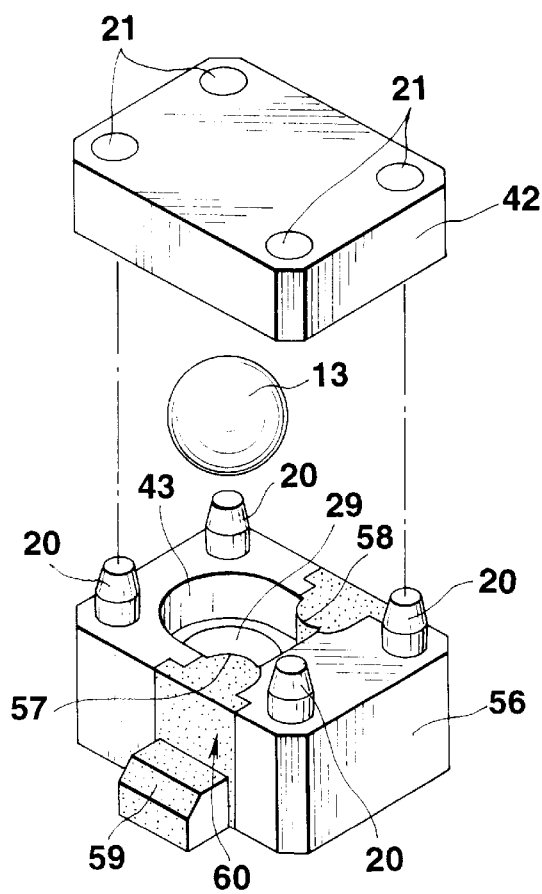
FIG. 28 is an exploded perspective view of the tilt detecting device shown in FIG. 27.

The tilt detecting device comprises an insulation case 55 and the conductive ball 13 which is movable in the insulation case 55 when the insulation case 55 is inclined, as shown in FIGS. 27 and 28.

The insulation case 55 comprises a body case 56 and the lid case 42, like the fourth embodiment. The containing portion 43 is formed in an interior of the body case 56 and the upper side of the containing portion 43 is opened to the upper surface side, as shown in FIG. 28. In a bottom portion of the body case 56, the recess portion 29 for containing the conductive ball 13 is formed, like the fourth embodiment. Two terminal portions 57 and 58 which are circular shaped are formed as a body with the inner surfaces of the containing portion 43 which are adjacent to the recess portion 29. Each projecting portion 59 is formed to project to the outside of the body case 56 on a lower portion of an outside surface of the body case 56, which faces to the two terminal portions 57 and 58.

Partial metal plating 60 is carried out by the electroless plating on the surfaces of the both two terminal portions 57 and 58, on surfaces of the body case 56 which are faced to the two terminal portions 57 and 58, and on surfaces including an lower surface of the both projecting portions 59. That is, two partial metal plating 60 is carried out on the body case 56 so that the two terminal portions 57 and 58 are not electrically connected with each other, like the fourth embodiment.

In four corners of an upper surface of the body case 56, each boss 20 is formed to project into the upper side, like the fourth embodiment. While in four corners of the lid case 42, fitting recesses 21 for fitting the bosses 20 of the body case 56 are formed. In the lower surface of the lid case 42, the containing portion 49 corresponding to the containing portion 43 of the body case 56 is formed and a lower side of the containing portion 49 is opened. In an upper surface of the interior of the containing portion 49, the recess portion 29 is formed, to which the conductive ball 13 is contained when the insulation case 55 is turned over upside down.

Figure 29A:
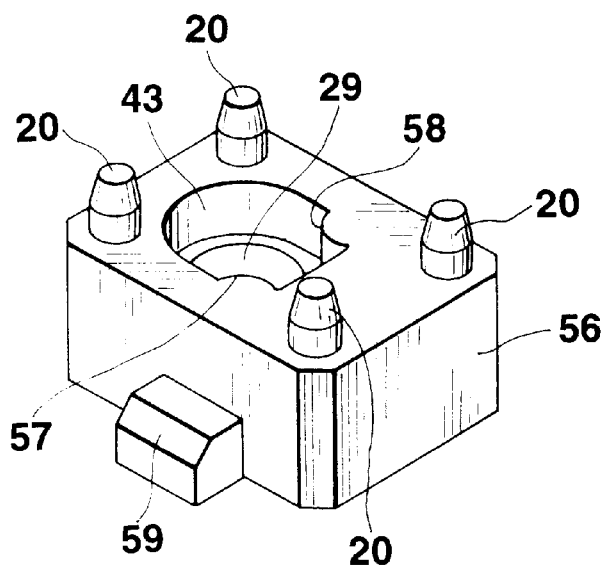
Figure 29B:
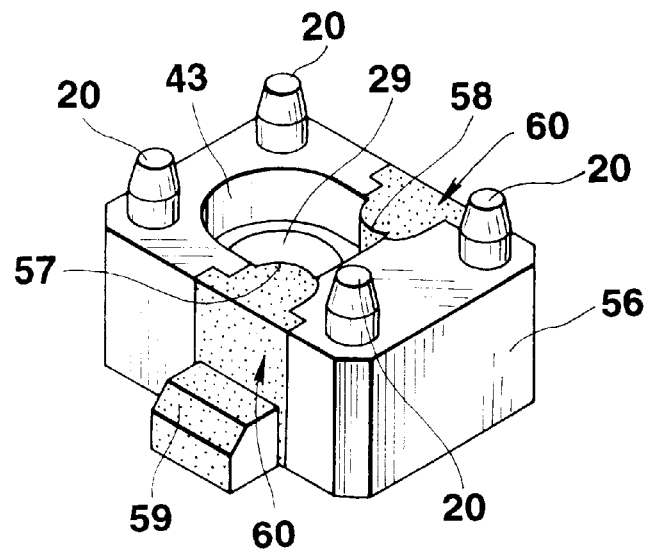

To produce the tilt detecting device, as shown in FIG. 29A, the body case 56 of the insulation case 55 is produced at first. The containing portion 43 is formed in the body case 56, the recess portion 29 is formed on the bottom portion of the containing portion 43, the two terminal portions 57 and 58 are formed in the inner surfaces of the containing portion 43, which are in vicinity of the recess portion 29, and the projecting portions 59 are formed as a body with the lower portions of the outside surface of the body case 56. The lower portions correspond to the two terminal portions 57 and 58. Thereafter, a masking is carried out on the predetermined portions of the surface of the body case 56, then, the partial metal plating 60 is carried out on the surfaces of the two terminal portions 57 and 58, on the surfaces of the body case 56, which correspond to the two terminal portions 57 and 58, and on the surfaces including the lower surfaces of the each projecting portion 59, as shown in FIG. 29B.

Thereafter, like the fourth embodiment, the conductive ball 13 is contained in the containing potion 43 of the body case 56 and the fitting recesses 21 of the lid case 42 are fitted to the bosses 20 on the upper surface of the body case 56. Then, the lid case 42 is combined with the body case 56 to produce the insulation case 55. Therefore, the containing portions 43 and 49 are faced to each other in the interior of the insulation case 55, so that the conductive ball 13 is contained to be movable in both of the containing portions 43 and 49.

As described above, according to the tilt detecting device, by inclining the insulation case 55 to move the conductive ball 13 out of the recess portion 29 of the insulation case 55, it is possible to make the conductive ball 13 in contact with both of the two terminal portions 57 and 58 having the partial metal plating 60, like the fourth embodiment. As the result, it is possible to electrically connect the two terminal portions 57 and 58 with each other through the conductive ball 13, so that the inclination can be detected.

In the tilt detecting device, the two terminal portions 57 and 58 and the body case 56 are formed as a body to expose the two terminal portions 57 and 58 to the containing portion 43. The partial metal plating 60 is carried out by the electroless plating on the surfaces of two terminal portions 57 and 58, on the surfaces of the body case 56, which correspond to the two terminal portions 57 and 58, and on the surfaces of the each projecting portion 59. As the result, it is not necessary for another member such a conductive pin or the like used in the first to third embodiments. Therefore, the numbers of members can be decreased and the work for assembling can be much simpler.

Further, according to the tilt detecting device, like the fourth embodiment, by connecting the each projecting portion 59 of the body case 56 with the circuit board 50 through the conductive double-coated tapes 52 to fix the insulation case 55 to the circuit board 50, it is possible to electrically connect the two terminal portions 57 and 58 of the body case 56 with the each connecting electrode 51 of the circuit board 50. Therefore, it is possible to connect the tilt detecting device with the circuit board 50 extremely easily. However, it is not necessary to attach the tilt detecting device to the upper surface of the circuit board 50, for example, which is connected with and fixed to the lower surface of the circuit board 50 through the conductive double-coated tape 52. When the tilt detecting device is turned over upside down to connect with the circuit board 50, although the conductive ball 13 is contained in the recess portion 29 in the containing potion 49 of the lid case 42, the tilt detecting device has the same function as the above-described case.

In the first to fifth embodiments, examples in which the tilt detecting device is used for the electronic watch are explained. However, the invention is not limited to this, for example, the tilt detecting device can be applied widely to another electronic watch such as a travel watch or the like and an electronic apparatus like a pager, i.e., pocket beeper or the like.

As described above, according to the embodiment of the tilt detecting device, as shown in FIGS. 1 to 8, which comprises: the insulation cases 14 and 15 having the projection 19 in a part of the ball containing portion 16 formed in the interior thereof; two conductive pins 11 and 12 which are disposed in parallel with each other with the predetermined space in the insulation case, and have the large diameter portion 11a and 12a, the small diameter portion 11b and 12b and the step between them; and the conductive ball 13 which is contained in the ball containing portion of the insulation cases and is movable along in the longitudinal direction of the two conductive pins in the ball containing portion when the insulation cases are inclined; wherein the projection is formed to have the height so that when the insulation cases are inclined and the conductive ball is at a position on the large diameter portions of the two conductive pins, the two conductive pins are electrically in contact with the conductive ball, while when the insulation case is inclined and the conductive ball is at a position on the small diameter portion of the two conductive pins, the conductive ball is in contact with the projection, and not electrically in contact with at least one of the two conductive pins.

The projection is, for example, formed between the two conductive pins.

According to the embodiment of the tilt detecting device, as shown in FIGS. 9 and 10, which comprises: the insulation cases 27 and 28 having the recess portion 29 formed in the inner surfaces of the ball containing portions 16 formed in the interior of the insulation cases; two conductive pins 25, 26, 25a and 26a disposed in the insulation cases; and the conductive ball 13 which is movable to the recess portion in the ball containing portion or from the recess portion to the outside thereof, when the insulation cases are inclined; wherein when the conductive ball is moved to the recess portion, the conductive ball is not electrically in contact with the two conductive pins not to output the corresponding detection signal, while when the conductive ball is moved from the recess portion to the outside thereof, the conductive ball is electrically in contact with the two conductive pins to output the corresponding detection signal.

The recess portion is formed in each of the inner surfaces, which faces to each other, of the ball containing portions, and the two conductive pins are positioned at the vicinity of the recess portion and disposed in perpendicular to the recess portion, as shown in FIGS. 9 and 10.

Further, as shown in FIG. 18, the tilt detecting device comprises the pair of connective fixing members 36 which are electrically connected with the two conductive pins and soldered to the connecting electrode 35a disposed on the circuit board.

According to the embodiment of the tilt detecting device, as shown in FIGS. 20 to 29, which comprises: the insulation cases 41 and 42 which have the two terminal portions 45, 47, 48, 57 and 58 which are provided with the metal plating 44 on the interior of the ball containing portion 43 and have the recess portion 29 formed in the vicinity of the end of the two terminal portions; and the conductive ball 13 which is movable to the recess portion in the ball containing portion or from the recess portion to the outside thereof, when the insulation cases are inclined; wherein when the conductive ball is moved to the recess portion, the conductive ball is not electrically in contact with the two terminal portions not to output the corresponding detection signal, while when the conductive ball is moved from the recess portion to the outside thereof, the conductive ball is electrically in contact with the two terminal portions to output the corresponding detection signal.

The two terminal portions 47 and 48 are formed with the insulation case 41 as a body by coinjection molding, with metal plating on the surface thereof, as shown in FIG. 24.

The two terminal portions 57 and 58 and the insulation case 55 are formed as a body with the same material as that of the insulation case and the metal plating is carried out on only surfaces corresponding to the two terminal portions, as shown in FIGS. 27 to 29.

The two terminal portions 47 and 48 are connected to the connecting electrodes 51 of the circuit board by the conductive double-coated tapes 52, as shown in FIG. 26.

As described above, according to the invention, the tilt detecting device comprises: the insulation case having the projection in the interior thereof; two conductive pins having the large diameter portion, the small diameter portion and the step between them; and the conductive ball which is movable along in the longitudinal direction of the two conductive pins in the ball containing portion when the insulation case is inclined; wherein the two conductive pins are disposed in interior of the insulation case approximately parallel and the projection in the insulation case is formed to have the height so that when the conductive ball is at a position on the large diameter portions of the two conductive pins, the two conductive pins are electrically in contact with the conductive ball, while when the conductive ball is at a position on the small diameter portion of the two conductive pins, the conductive ball is not electrically in contact with at least one of the two conductive pins.

Therefore, by inclining the insulation case to incline the two conductive pins in the longitudinal direction suitably, it is possible to position the conductive ball either on the large diameter portions or on the small diameter portion, of the conductive pins. Therefore, it is possible to put the two conductive pins electrically in a connected state through the conductive ball, and it is also possible to put the one in a cut-off state, so that it is possible to detect the inclination. Further, because the two conductive pins are disposed approximately in parallel in the insulation case, it is possible to form the two conductive pins in the same shape as each other, so that the members of the tilt detecting device can be made in common. Thus, the structure of the device can be simple and the work efficiency for assembling the device can be improved, so that the price of the device can be low.

In accordance with another aspect of the invention, the tilt detecting device comprises: the insulation case having the recess portion formed in the inner surface of a ball containing portion formed in the interior of the insulation case; two conductive pins disposed in the insulation case; and the conductive ball which is movable in the ball containing portion when the insulation case is inclined; wherein when the conductive ball is moved to the recess portion, the conductive ball is not in contact with the two conductive pins, while when the conductive ball is moved from the recess portion to the outside thereof, the conductive ball is in contact with the two conductive pins. As the result, when the conductive ball is moved out of the recess portion in the insulation case with inclining the insulation case, it is possible to put the conductive ball in contact with both of the two conductive pins. Therefore, it is possible to electrically connect the two conductive pins with each other through the conductive ball, so that it is possible to detect the inclination. Further, because it is possible to form the two conductive pins in absolutely the same shape as each other, so that the members of the tilt detecting device can be made in common, the structure of the device can be simple, the work efficiency for assembling the device can be improved, the price of the device can be low.

According to further aspect of the invention, the tilt detecting device comprises: the insulation case which has the two terminal portions which are provided with the metal plating on the interior of the ball containing portion and has the recess portion formed in the vicinity of the end of the two terminal portions; and the conductive ball which is movable in the insulation case when the insulation case is inclined; wherein when the conductive ball is moved to the recess portion, the conductive ball is not electrically in contact with the two terminal portions, while when the conductive ball is moved from the recess portion to the outside thereof, the conductive ball is electrically in contact with the two terminal portions.

As the result, by inclining the insulation case to move the conductive ball out of the recess portion in the insulation case, it is possible to electrically connect the two terminal portions having the metal plating with each other through the conductive ball, so that it is possible to detect the inclination. Further, because the two terminal portions are formed in the insulation case as a body, the number of members of the tilt detecting device can be decreased so that the work for assembling the device can be simplified remarkably.

What is claimed is:

1. A tilt detecting device comprising:
 a conductive ball which is made of conductive material;
 an insulation housing comprising a pair of cases which have concavities at surfaces thereof which face each other to form a ball containing chamber for containing the conductive ball, said concavities having bottom surfaces and a recess portion formed in at least one of the bottom surfaces for keeping the conductive ball stable; and
 two conductive pins each having two end portions which are mounted to the pair of cases, respectively, said two conductive pins passing through the ball containing chamber of the insulation housing approximately in parallel with each other with a predetermined space therebetween;
 wherein when the insulation housing is only slightly inclined at an angle less than a predetermined value, the conductive ball does not exit the recess portion due to gravity and the conductive ball is not in contact with the two conductive pins, so that an electrical state between the two conductive pins is off and no detection signal is output; and
 wherein when the insulation housing is inclined at an angle greater than the predetermined value, the conductive ball exits the recess portion due to gravity and is brought into electrical contact with the two conductive pins, so that the electrical state between the two conductive pins is switched to on and a corresponding detection signal is output.

2. The tilt detecting device as claimed in claim 1, wherein the recess portion is formed in each of the bottom surfaces of the cavities.

3. The tilt detecting device as claimed in claim 1, wherein attachment holes are formed in the pair of cases, and each conductive pin has large diameter portions and a small diameter portion, said large diameter portions being mounted to the pair of cases through the attachment holes.

4. The tilt detecting device as claimed in claim 1, wherein the insulation housing is mounted to a circuit board.

5. The tilt detecting device as claimed in claim 1, wherein the conductive pins are made of an inelastic material.

6. A tilt detecting device comprising:
 a conductive ball which is made of conductive material;
 an insulation case comprising a ball containing chamber formed to contain the conductive ball such that the conductive ball is movable therein, and a recess portion formed to keep the conductive ball stably on a bottom surface of the ball containing chamber;
 two conductive pins each having two end portions which are mounted at upper and lower predetermined positions of the insulation case, respectively said two conductive pins passing through the ball containing chamber approximately in parallel with each other with a predetermined space therebetween and approximately perpendicular to the bottom surface in which the recess portion is formed;

wherein when the insulation case is only slightly inclined at an angle less than a predetermined value, the conductive ball does not exit the recess portion due to gravity and the conductive ball is not in contact with the two conductive pins, so that an electrical state between the two conductive pins is off and no detection signal is output; and wherein when the insulation case is inclined at an angle greater than the predetermined value, the conductive ball exits the recess portion due to gravity and is brought into electrical contact with the two conductive pins, so that the electrical state between the two conductive pins is switched to on and a corresponding detection signal is output.

7. The tilt detecting device as claimed in claim 6, wherein the insulation case comprises another recess portion formed to keep the conductive ball stably in an upper surface of the ball containing chamber when the insulation case is turned upside down.

8. The tilt detecting device as claimed in claim 6, wherein attachment holes are formed at the upper and lower predetermined positions of the insulation case, and each conductive pin has large diameter portions and a small diameter portion, said large diameter portions being mounted to the insulation case through the attachment holes.

9. The tilt detecting device as claimed in claim 6, wherein the insulation case is mounted to a circuit board.

10. The tilt detecting device as claimed in claim 6, wherein the conductive pins are made of an inelastic material.

* * * * *